US012159777B2

(12) United States Patent
Cooks et al.

(10) Patent No.: US 12,159,777 B2
(45) **Date of Patent: *Dec. 3, 2024**

(54) TWO-DIMENSIONAL MASS SPECTROMETRY USING ION MICROPACKET DETECTION

(71) Applicant: Purdue Research Foundation, West Lafayette, IN (US)

(72) Inventors: Robert Graham Cooks, West Lafayette, IN (US); Dalton Snyder, West Lafayette, IN (US); Lucas Szalwinski, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,656

(22) Filed: Oct. 31, 2023

(65) Prior Publication Data

US 2024/0063009 A1 Feb. 22, 2024

Related U.S. Application Data

(63) Continuation of application No. 16/972,099, filed as application No. PCT/US2019/033715 on May 23, 2019, now Pat. No. 11,804,370.

(Continued)

(51) Int. Cl.
*H01J 49/00* (2006.01)

(52) U.S. Cl.
CPC ........ *H01J 49/004* (2013.01); *H01J 49/0031* (2013.01); *H01J 49/0081* (2013.01)

(58) Field of Classification Search
CPC ................. H01J 49/004; H01J 49/0031; H01J 49/0081

(Continued)

(56) References Cited

U.S. PATENT DOCUMENTS

| | | |
|---|---|---|
| 5,644,131 A | 7/1997 | Hansen |
| 6,838,666 B2 | 1/2005 | Ouyang et al. |

(Continued)

FOREIGN PATENT DOCUMENTS

| | | |
|---|---|---|
| WO | 2009/102766 A1 | 8/2009 |

OTHER PUBLICATIONS

Bonner, 1977, The Cylindrical Ion Trap, International Journal of Mass Spectrometry and Ion Physics, 24(3):255-269.

(Continued)

*Primary Examiner* — Nicole M Ippolito
(74) *Attorney, Agent, or Firm* — Brown Rudnick LLP; Adam M. Schoen

(57) ABSTRACT

The invention generally relates to two-dimensional mass spectrometry using ion micropacket detection. In certain aspects, the invention provides systems including a mass spectrometer having an ion trap and one or more detectors. The system includes a central processing unit (CPU), and storage coupled to the CPU for storing instructions that when executed by the CPU cause the system to: apply one or more scan functions to the ion trap that excite a precursor ion and eject a product ion from the ion trap; and determine a secular frequency of the product ion by detecting micropackets of the product ion as the micropackets are ejected from the ion trap.

6 Claims, 31 Drawing Sheets

Related U.S. Application Data

(60) Provisional application No. 62/680,191, filed on Jun. 4, 2018.

(58) Field of Classification Search
USPC ................................ 250/281, 282, 283, 288
See application file for complete search history.

(56) References Cited

U.S. PATENT DOCUMENTS

| | | | | |
|---|---|---|---|---|
| 7,335,897 | B2 | 2/2008 | Takats et al. | |
| 8,304,718 | B2 | 11/2012 | Ouyang et al. | |
| 11,804,370 | B2 * | 10/2023 | Cooks | H01J 49/0031 |
| 2012/0119079 | A1 | 5/2012 | Ouyang et al. | |
| 2017/0133215 | A1 | 5/2017 | Remes et al. | |

OTHER PUBLICATIONS

Carroll, 1975, Atmosphere pressure ionization mass spectrometry. Corona discharge ion source for use in a liquid chromatograph-mass spectrometer-computer analytical system, Anal. Chem., 47:2369-2373.

Cody, 2005, Versatile New Ion Source for the Analysis of Materials in Open Air under Ambient Conditions, Anal. Chem., 77(8):2297-2302.

Fenn, 1989, Electrospray ionization for mass spectrometry of large biomolecules, Science, 246(4926):64-71.

Gao, 2006, Handheld Rectilinear Ion Trap Mass Spectrometer, Anal. Chem., 78:5994-6002.

Gao, 2008, Design and Characterization of a Multisource Hand-Held Tandem Mass Spectrometer, Anal. Chem. 2008, 80(19):7198-7205.

Guan, 1989, General phase modulation method for stored waveform inverse Fourier transform excitation for Fourier transform ion cyclotron resonance mass spectrometry, J. Chem. Phys., 91:775-777.

Hagar, 2002, A new linear ion trap mass spectrometer, Rapid Communications in Mass Spectrometry, 16(6):512-526.

Hendricks, 2014, Autonomous in-situ analysis and real-time chemical detection using a backpack miniature mass spectrometer: concept, instrumentation development, and performance, Anal Chem, 86:2900-2908.

Hou, 2011, Sampling wand for an ion trap mass spectrometer, Anal Chem., 83:1857-1861.

Kogelschatz, 2003, Dielectric-barrier Discharges: Their History, Discharge Physics, and Industrial Applications, Plasma Chem. and Plasma Processing, 23:1-46.

Laiko, 2000, Atmospheric Pressure Matrix-Assisted Laser Desoprtion/Ionization Mass Spectrometry, Analytical Chemistry, 72(4):652-657.

Li, 2014, Miniature Ambient Mass Analysis System, Anal. Chem., 86:2909-2916.

Liu-Snyder P, Borgens R. B., and Shi R. (2006) Hydralazine rescues PC12 cells from acrolein-mediated death. J Neurosci Res 84:219-227.

Liu-Snyder, 2006, Acrolein-mediated mechanisms of neuronal death. J Neurosci Res 84:209-218.

Schwartz, 2002, A two-dimensional quadrupole ion trap mass spectrometer, J Am Soc Mass Spectrom, 13(6):659-669.

Shiea, 2005, Electrospray-assisted laser desorption/ionization mass spectrometry for direct ambient analysis of solids, J. Rapid Communications in Mass Spectrometry, 19:3701-3704.

Snyder, 2016, Calibration procedure for secular frequency scanning in ion trap mass spectrometers, Rapid Commun. Mass Spectrom., 30:1190-1196.

Snyder, 2016, Linear mass scans in quadrupole ion traps using the inverse Mathieu q scan, Rapid Commun. Mass Spectrom., 30(22):2369-2378.

Snyder, 2016, Miniature and Fieldable Mass Spectrometers: Recent Advances, Anal. Chem., 88:2-29.

Snyder, 2016, Single analyzer precursor scans using an ion trap, Rapid Commun. Mass Spectrom., 30:800-804.

Snyder, 2017, Simultaneous ad Sequential MS/MS Scan Combinations and Permutations in a Linear Quadrupole Ion Trap, Analytical Chemisrty, 89(20):11053-11060.

Snyder, 2017, Single Analyzer Neutral Loss Scans in a Linear Quadrupole Ion Trap Using Orthogonal Double Resonance Excitation, Anal. Chem., 89(15):8148-8155.

Snyder, 2017, Single Analyzer Precursor Ion Scans in a Linear Quadrupole Ion trap Using Orthogonal Double Resonance Excitation, J. Am. Soc. Mass Spectrom., 28:1929-1938.

Snyder, 2016, Experimental Characterization of Secular Frequency Scanning in an Ion Trap Mass Spectrometers, J. Am. Soc. Mass Spectrom. 27:1243-1255.

Sokol, 2011, Miniature mass spectrometer equipped with electrospray and desorption electrospray ionization for direct analysis of organics from solids and solutions, Int. J. Mass Spectrum. 306:187-195.

Tanaka, 1988, Protein and Plymer Analyses up to m/z 100 000 by Laser Ionization Time-of-Flight Mass Spectrometry, Rapid Commun. Mass Spectrom., 2(8):151-153.

Whitten, 2004, High pressure ion trap mass spectrometry, J.M. Rapid Commun Mass Spectrom, 18:1749-1752.

Yamashita, 1984, Electrospray lon Source, Another Variation on the Free-Jet Theme, J. Phys. Chem. 88:4451-4459.

* cited by examiner

| Compound (m/z) | Product Ion m/z |
|---|---|
| Serine (m/z 106) | 88,60 |
| Valine (m/z 118) | 72 |
| Is leucine (m/z 132) | 86 |
| Methionine (m/z 150) | 133,104 |

TWO-DIMENSIONAL MASS SPECTROMETRY USING ION MICROPACKET DETECTION

RELATED APPLICATION

The present application is a continuation of U.S. nonprovisional application Ser. No. 16/972,099, filed Dec. 4, 2020, which is a 35 U.S.C. § 371 national phase application of PCT/US19/33715, filed May 23, 2019, which claims the benefit of and priority to U.S. provisional application Ser. No. 62/680,191, filed Jun. 4, 2018, the content of each of which is incorporated by reference herein in its entirety.

FIELD OF THE INVENTION

The invention generally relates to two-dimensional mass spectrometry using ion micropacket detection.

BACKGROUND

The beginnings of tandem mass spectrometry (MS/MS or $MS^n$) date back to the first mass-analyzed ion kinetic energy spectrometer (MIKES) developed at Purdue University. Tandem MS, the production and mass analysis of fragment ions from mass-selected precursor ions, is particularly useful for complex mixture analysis and has served as the backbone of fields as diverse as proteomics, forensics, environmental monitoring, and biomarker discovery.

Amongst the activation methods for MS/MS are collision-induced dissociation (CID), ultraviolet photo dissociation, infrared multiphoton dissociation, electron transfer dissociation, surface-induced dissociation, and others. Collision-induced dissociation has been especially notable in the development of the suite of MS/MS scan modes which includes three prominent members—product ion scans, precursor ion scans, and neutral loss scans—as well as other notable modes—doubly charged ion scans, reaction intermediate scans, multiple reaction monitoring, and functional relationship scans.

Although neutrals are not directly measurable by mass spectrometers, they are indirectly accessible by a variety of methods and they carry important analytical information. The two most prominent techniques for probing neutral species are neutralization-reionization mass spectrometry (NRMS) and the neutral loss scan in MS/MS. The NRMS experiment neutralizes a mass-selected ion, usually by charge exchange or CID, and the resulting neutral undergoes energetic collisions which produce neutral fragments that are re-ionized and mass analyzed. Hypervalent and other unusual species can be produced and characterized, a unique capability.

By contrast, in a neutral loss MS/MS experiment a precursor ion is mass-selected by a first mass analyzer and undergoes activation to produce a product ion and a neutral. The product ion is mass selected for detection by a second analyzer. For the neutral loss scan, the relationship between the precursor ion mass-to-charge ratio (m/z) and the product ion m/z is fixed—that is, the neutral mass is constant—and as such it describes a shared molecular functionality of a group of precursor ions. In comparison, the precursor ion scan selects a fixed product ion m/z which might also correspond to a common functionality in all precursor ions which yield this fragment.

Because mass selection of both precursor and product ion is necessitated in precursor ion and neutral loss scans, the prevailing wisdom in mass spectrometry has been that multiple mass analyzers are required.

Two-dimensional Fourier transform ion cyclotron resonance mass spectrometry (2D FT-ICR MS) allows the correlation between precursor and fragment ions in tandem mass spectrometry without the need to isolate the precursor ion beforehand. 2D FT-ICR MS has been optimized as a data-independent method for the structural analysis of compounds in complex samples. Data processing methods and de-noising algorithms have been developed to use it as an analytical tool. To date, however, 2D MS has not been demonstrated experimentally on quadrupole ion traps.

SUMMARY

The invention provides systems and methods of conducting two-dimensional mass spectrometry scans in an ion trap (e.g., a linear quadrupole ion trap) by fragmenting precursor ions and ejecting product ions while detecting the product ion micropackets at a detector. The micropacket technique offers better resolution and reduced harmonic overlap than frequency tagging and uses faster detection electronics. Importantly, systems and methods of the invention allow for correlating precursor and product ions in an ion trap without ion isolation.

In certain aspects, the invention provides systems including a mass spectrometer having an ion trap and one or more detectors. The system includes a central processing unit (CPU), and storage coupled to the CPU for storing instructions that when executed by the CPU cause the system to: apply one or more scan functions to the ion trap that excite a precursor ion and eject a product ion from the ion trap; and determine a secular frequency or related frequency (e.g. a harmonic) of the product ion by detecting micropackets of the product ion as the micropackets are ejected from the ion trap. The one or more scan functions can be applied in a manner that precursor and product ions can be correlated in an ion trap without ion isolation.

In other aspects, the invention provides methods for operating a mass spectrometer that involve applying one or more scan functions to an ion trap of a mass spectrometer that excite a precursor ion and eject a product ion from the ion trap; and determining a secular frequency of the product ion by detecting micropackets of the product ion as the micropackets are ejected from the ion trap.

In certain embodiments of the above systems and methods, the one or more scan functions that excite the precursor ion comprise a nonlinear frequency sweep at a constant rf voltage. In other embodiments of the above systems and methods, the one or more scan functions that eject a product ion from the ion trap comprise a broadband waveform. In certain embodiments of the above systems and methods, a fast Fourier transform of a mass spectral peak recovers the secular frequency of the product ions. In certain embodiments of the above systems and methods, the system comprises two detectors and a fast Fourier transform of a mass spectral peak recovers twice the secular frequency of the product ion. In some embodiments of the above systems and methods, a rate of appearance of the micropackets at the one or more detectors corresponds to an excitation frequency of the precursor ion. In other embodiments of the above systems and methods, the instructions that when executed by the CPU cause the system to eject the micropackets at regularly spaced intervals. In certain embodiments of the above systems and methods, the ion trap is pressurized with helium, nitrogen, air, or other collision gases commonly used in ion traps.

In certain embodiments, the rf amplitude is kept constant so the ions' frequencies stay constant and a frequency sweep is used to excite the precursor ions while ejecting the products with a broadband. In other embodiments, the rf amplitude is ramped linearly during the scan, thereby increasing the ions' secular frequencies as a function of time. In other embodiments, the precursor ions are fragmented at a fixed Mathieu q value (fixed frequency). Using either of the above approaches, the product ions are then ejected using a broadband waveform. A fast Fourier transform of a mass spectral peak recovers the secular frequency of the product ions (or a related frequency, e.g. a harmonic).

In certain embodiments of the above systems and methods, the system additionally includes an ionization source and the methods additionally involve ionizing a sample to produce sample ions; and introducing the sample ions into the mass spectrometer.

BRIEF DESCRIPTION OF THE DRAWINGS

FIG. 11 panel B shows frequency spectrum of each peak. FIG. 11 panel C shows 2D representation of the spectrum. Known product ion m/z values are marked in (Panel B).

FIG. 18 panel B shows frequency spectrum of each peak. FIG. 18 panel C shows mass calibrated product ion spectra. FIG. 18 panel D shows 2D representation of the spectrum. Known product ion m/z values are marked in (panel B) and (panel C).

(Panel A) Two-dimensional mass spectrum as recorded at the electron multiplier detector using the 'frequency tagging' technique, (Panel B) extracted product ion scans (in the frequency domain) obtained through FFT of each peak in panel a, (Panel C) two-dimensional mass spectrum recorded using the alternative micropacket technique, and (Panel D) extracted product ion scans from Panel C. Expected precursor and product ions are indicated in the table. Note that all spectra in panels (Panel C) and (Panel D) were normalized.

Figure 22:
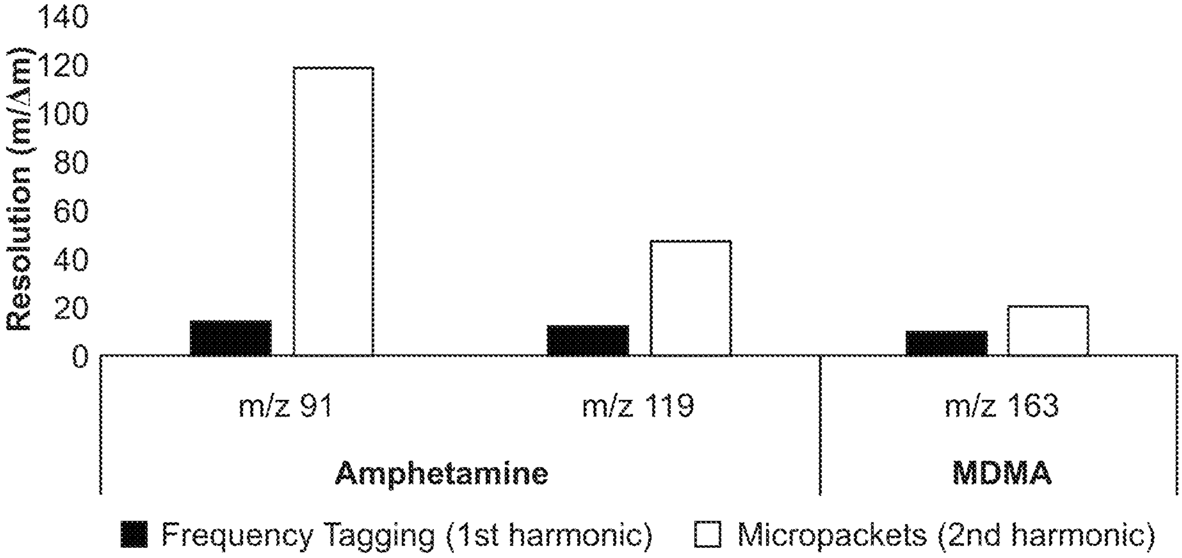

FIG. 22 shows product ion resolution comparison between 2D MS/MS using frequency tagging (blue, 1st harmonic) and the ion micropacket method (red, 2nd harmonic).

DETAILED DESCRIPTION

A method of correlating precursor and product ions in a linear quadrupole ion trap without ion isolation—that is, two-dimensional mass spectrometry—is described herein and compared to a previously described 'frequency tagging' method. Like 'frequency tagging', precursor ions are mass-selectively activated by a nonlinear frequency sweep at constant rf voltage while a broadband waveform is used to eject all possible product ions of each precursor ion. Precursor ion m/z is deduced from fragmentation time, which also correlates in time with the ejection of the product ions. Instead of inducing a low-kHz secondary frequency to differentiate the product ions at the electron multiplier detector, the ions' secular frequencies themselves are determined by detecting the product ion micropackets as they are ejected using a fast current amplifier and MHz data acquisition system. A fast Fourier transform of each mass spectral peak recovers the secular frequency of each product ion (or twice the secular frequency if two detectors are used) which can then be related to product ion m/z through the Mathieu parameters. We show here that the ion micropacket method has several notable advantages over frequency tagging, specifically that product ion resolution is improved by at least a factor of 4 and that harmonic overlap is reduced. Moreover, the resolution of the precursor ions is improved by using helium instead of nitrogen without significantly compromising the resolution of the product ions.

Ions can only be ejected during certain 'allowed' periods in a quadrupole ion trap operated in the resonance ejection mode. This has been observed through both simulatio[5,6] and experiment[7] by several groups using a variety of ion trap configurations. As ions are resonantly excited for ejection through application of an auxiliary frequency, they oscillate coherently and are ejected such that the rate of appearance of the micropackets at the detector corresponds to the excitation frequency (not the ion secular frequency). If a detector is placed on either side of the ion trap, then the micropackets are observed at a frequency corresponding to twice the auxiliary frequency since the ions are equally likely to be ejected through either x electrode slit. The frequency of ejection can be determined through Fourier transform of each mass spectral peak, assuming the detection electronics are fast and sensitive enough to observe the micropackets.

Figure 1:
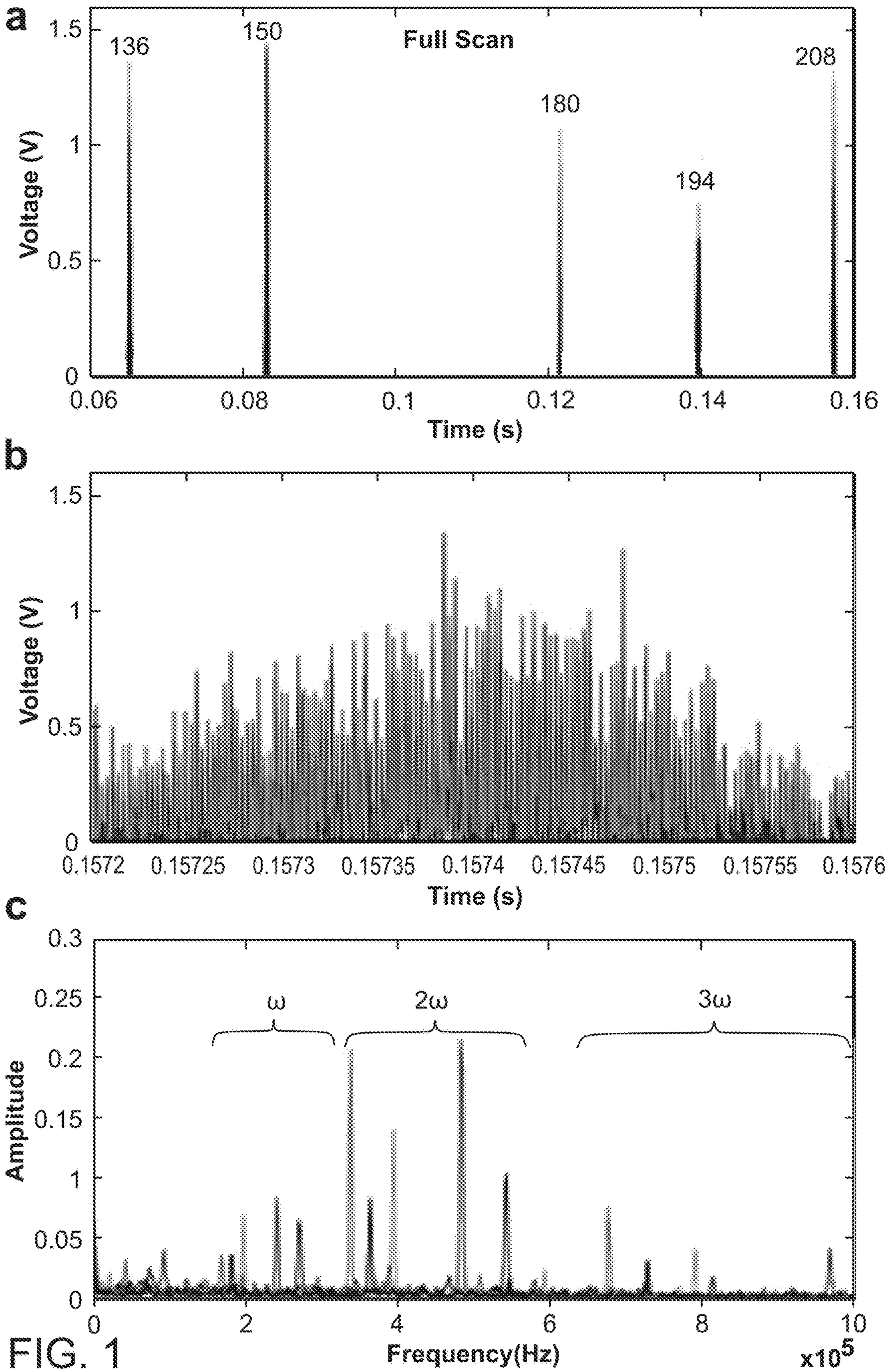
FIG. 1 panels A-F show ion micropacket detection in various modes of operation: (panel A) oscilloscope traces of each peak from a full scan of a set of five amphetamines and (panel D) a precursor ion scan of m/z 163, showing one artifact at m/z 150, (panel B),(panel E) zoomed in traces of m/z 208 showing the ion micropackets, and (panel C),(panel F) fast fourier transforms of each peak from (panel A) and (panel D), respectively.
Figure 1:
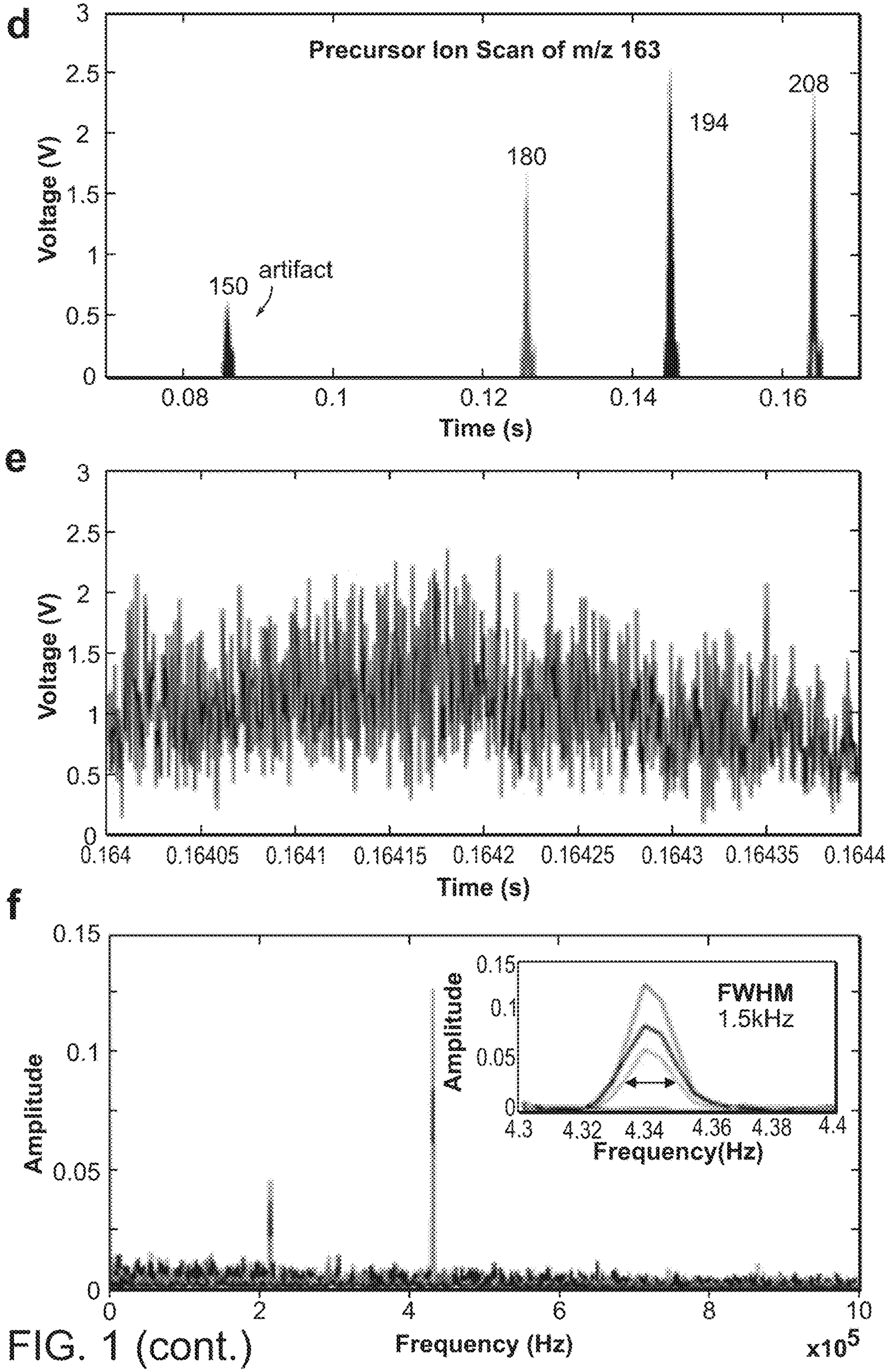

For example, FIG. 1 panel A shows oscilloscope traces of five peaks from an AC frequency scan mass spectrum of a set of amphetamines. Because the electrometer board on the LTQ filters the signal from the electron multipliers, we chose to bypass it and use an external transimpedance amplifier instead. As shown in FIG. 1 panel B, the ion micropackets of m/z 208 are clearly observed at regularly spaced intervals, the frequency of which can be obtained by calculating the fast Fourier transform of the peak (FIG. 1 panel C). The auxiliary frequency at the time of ion ejection as well as the second and third harmonics are observed. For m/z 208, the primary peak (second harmonic) is 339.6 kHz, implying that the precursor ions were ejected at 339.6/2=169.8 kHz. A third harmonic of the secular frequency is observed at 508.4 kHz, and a second harmonic of 339.6 kHz is observed at 677.1 kHz. In this last case, 677.1 kHz is not a harmonic of the ion's ejection frequency but rather a harmonic of twice the ion's ejection frequency. Notably, the second harmonic (the frequency of ejection doubled) is the dominant peak, again because ions can be detected in the positive and negative x directions. When only a single detector is used, then the ejection frequency itself is the dominant peak (not shown).

This application also demonstrates that the systems and methods of the invention are also useful for determining which peaks in ion trap precursor and neutral loss spectra are artefactual. For example, FIG. 1 panel D displays four oscilloscope traces from a precursor ion scan of m/z 163, which ideally should only detect m/z 180, 194, and 208. However, m/z 150 produces fragments that are unstable during the scan and are hence immediately ejected and detected alongside the resonantly ejected m/z 163 ions. FIG. 1 panel E is the trace of the peak at m/z 208. Although it is less evident than FIG. 1 panel B, there is regularity in the appearance of the product ion micropackets which is evidenced by the Fourier transforms in FIG. 1 panel F. In this case it is the product ion micropackets that are observed instead of the precursor ion micropackets. The experimental frequency of ejection was 217 kHz and thus the ion micropackets are observed at 434 kHz. For the artifact (m/z 150), no frequency information is evident in the Fourier transform (orange trace) because boundary ejection is chaotic, whereas resonance ejection is orderly.

Ion micropackets can also be used for two-dimensional mass spectrometry scans in a quadrupole ion trap. Experimentally, the 2D MS/MS scan is identical to the precursor ion scan in that precursor ions are excited in the y dimension using an AC frequency sweep (with constant rf voltage) while the product ions are ejected toward the detectors in the x dimension through application of another auxiliary waveform. In the case of the precursor scan, only a single m/z need be targeted, requiring a single frequency. For a 2D MS/MS scan, all possible product ions of the excited precursors are ejected using a broadband waveform. As described herein, because the possible range of product ion m/z values changes with the excited precursor ion m/z, the frequency coverage of the broadband sum of sines also varies with time. In the experiments herein, the frequency spacing of the waveform was 1 kHz from start frequency 62 kHz to end frequency 583 kHz, but only frequencies at least 10 kHz above the y dimension excitation frequency were included in the corresponding broadband waveform at each time point.

Figure 2:
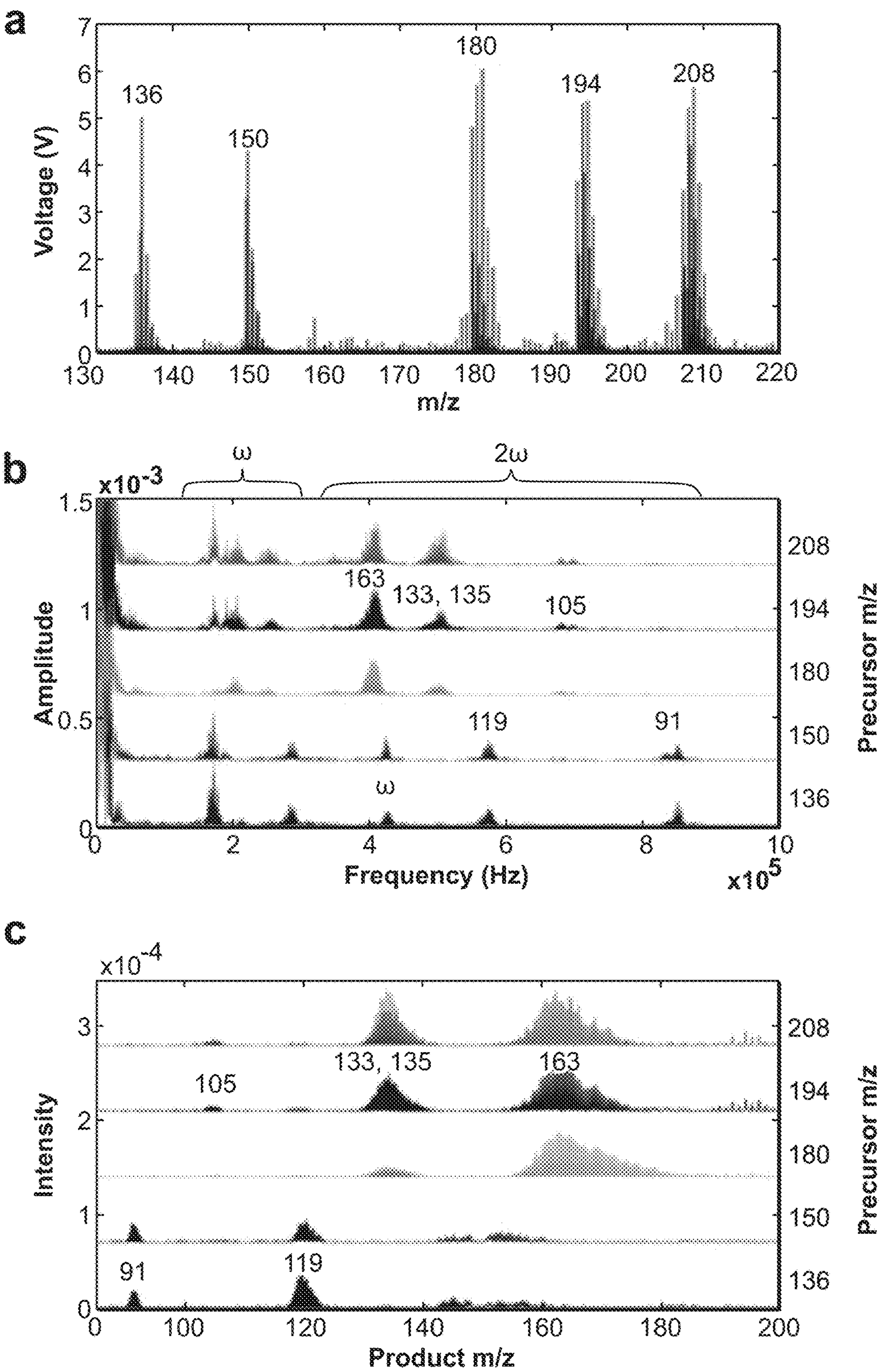
FIG. 2 panels A-C show 2D MS using ion micropacket detection. (panel A) mass calibrated spectrum of five amphetamines and (panel B) frequency spectra (i.e. product ion spectra) of each peak. Known product ion m/z values are marked. Based on the data in panels A and B, mass calibrated product ion spectra in panel C were generated.
Figure 3A:
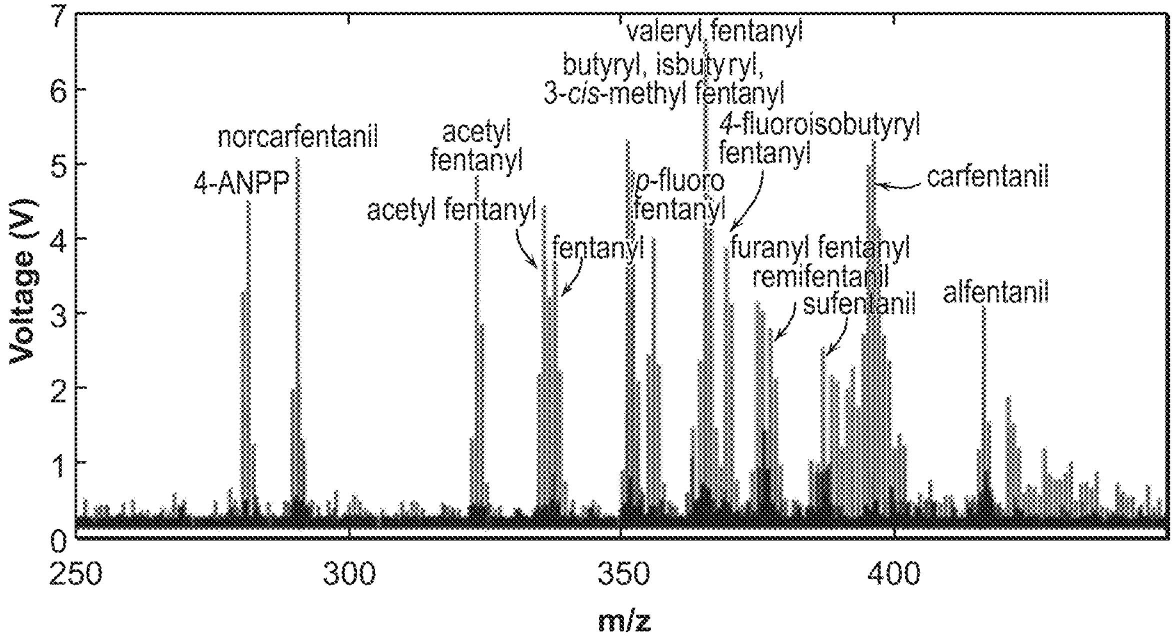
FIG. 3 panels A-E show 2D MS of fentanyl analogues. (panel A) mass calibrated spectrum of sixteen fentanyl analogues and (panel B) frequency spectra (i.e. product ion spectra) of each peak. Known product ion m/z values are marked.
Figure 3B:
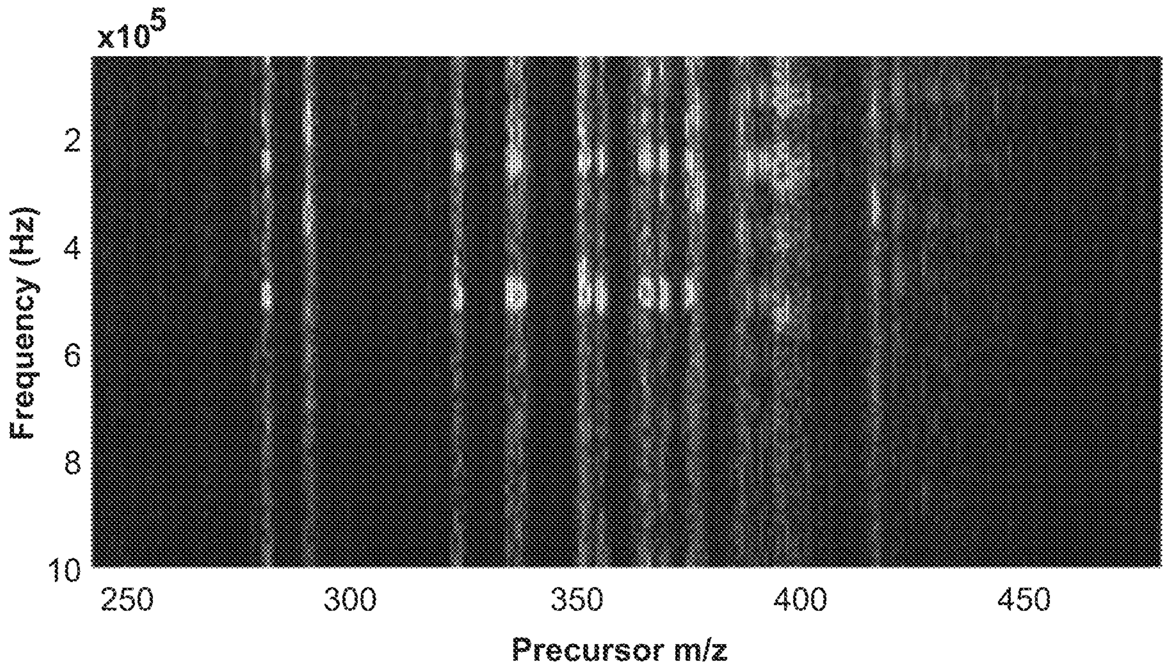
Figure 3C:
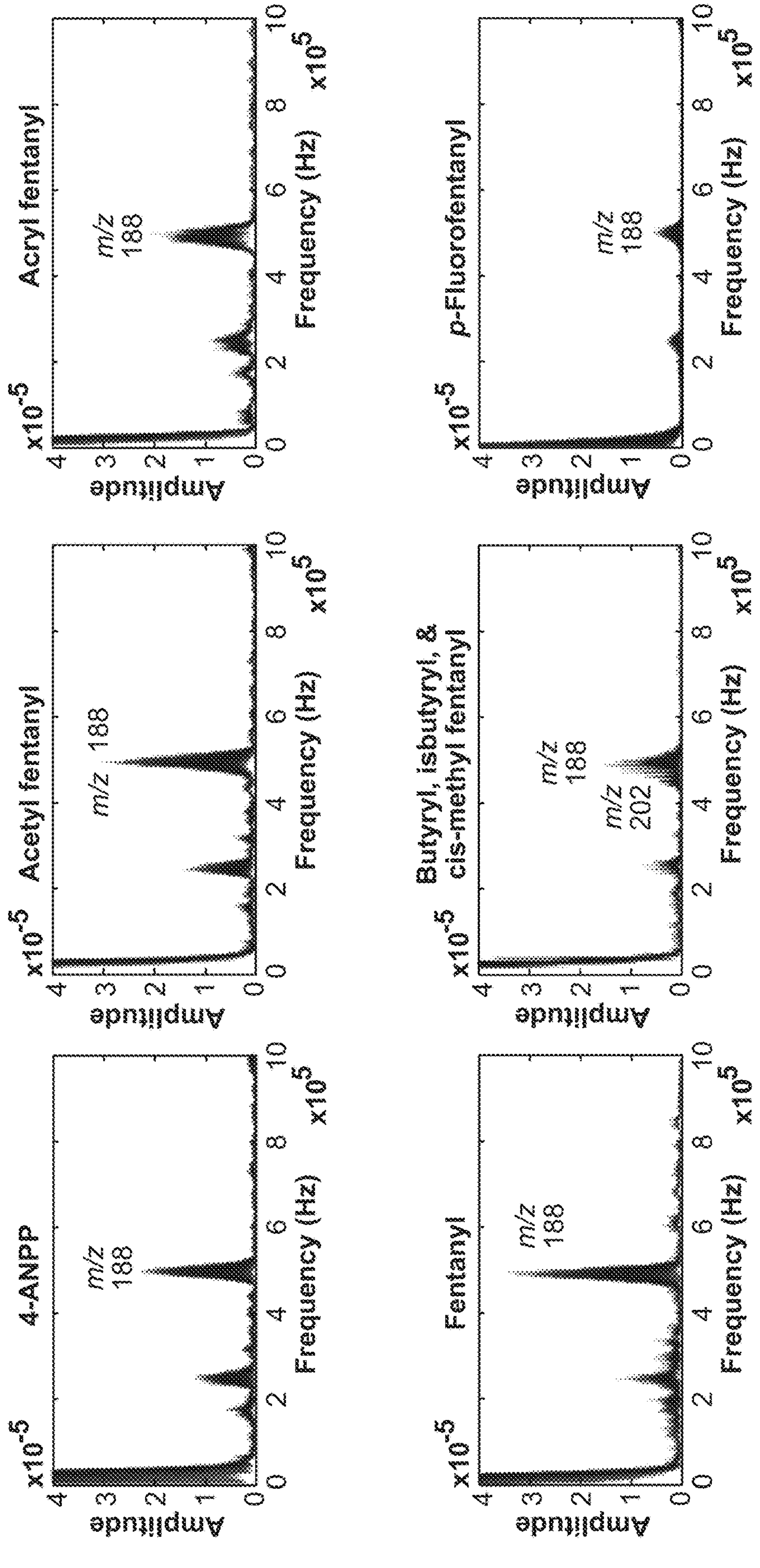
Figure 3D:
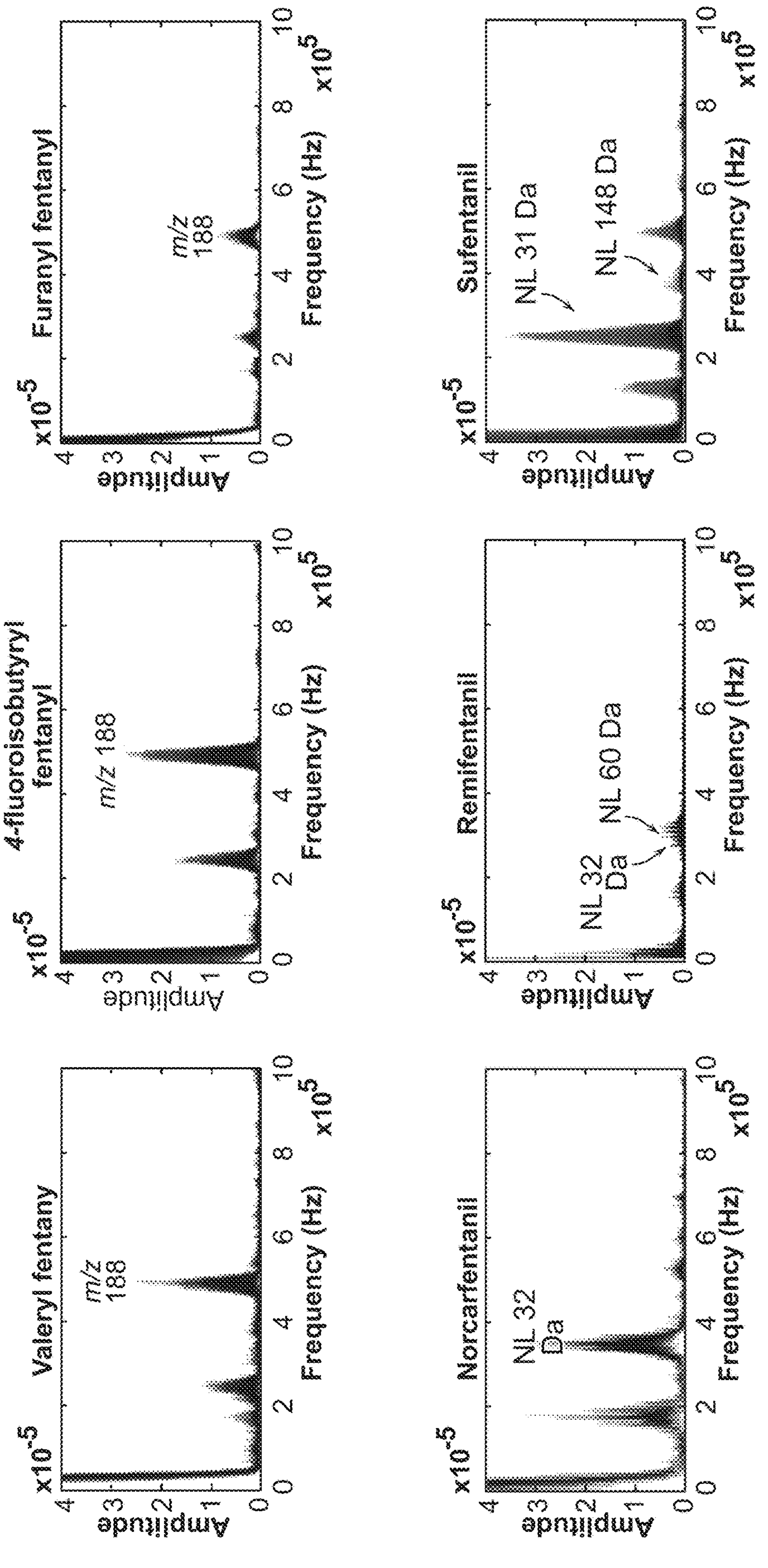
Figure 3E:
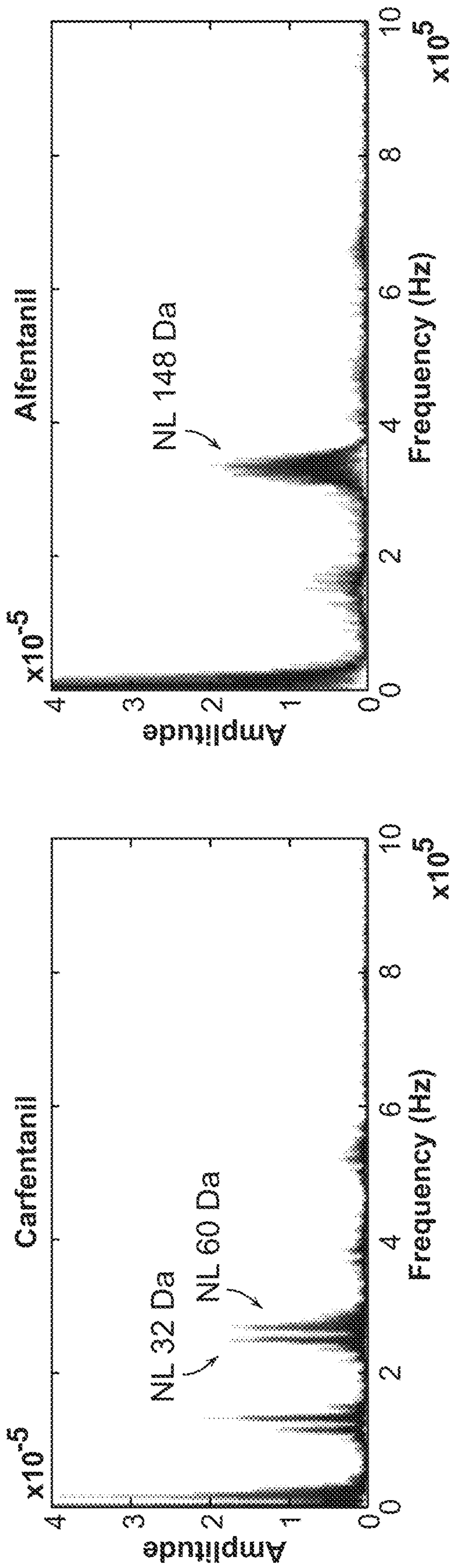

FIG. 2 panel A shows the two-dimensional mass spectrum of the same set of five amphetamines. Note the beats in the peaks which are caused by the broadband waveform frequency spacing and distribution of phases. The ion micropackets are also present within these beat patterns and can be determined via Fourier transform of the individual peaks (FIG. 2 panel B). Peaks widths of 10 ms containing 20,000 points were used for the FFTs. Amphetamine (m/z 136) and methamphetamine (m/z 150) fragment to m/z 91 and m/z 119, and these peaks are noted. The shared product ions of 3,4-methylenedioxyamphetamine (m/z 180), 3,4-methylenedioxymethamphetamine (m/z 194), and 3,4-methylenedioxyethylamphetamine (m/z 208) are also labeled. All labeled peaks are frequency doubled (second harmonic of the secular frequency) since these have higher intensity than the primary frequency and also give better resolution, which is unsurprising. We can calibrate the secular frequency to m/z conversion through Mathieu parameters using the known product ion m/z values and the center of the product ion frequency profiles in FIG. 2 panel B. Based on these data, mass calibrated product ion spectra in FIG. 2 panel C were generated. Clearly the resolution at low m/z (high Mathieu q) is best (approaching unit for m/z 91), which is expected and discussed later.

FIG. 3 panel A is a 2D MS spectrum of a set of 16 fentanyl analogues and metabolites with product ion frequency spectra given in FIG. 3 panel B. The similarities between many of the analytes is notable, with m/z 188 (~500 kHz) being the primary fragment. For the isobaric mixture of butyryl, isobutyryl, and cis-3-methyl fentanyl, both m/z 188 (butyryl, isobutyryl) and m/z 202 (cis-3-methyl) are observed at the second harmonic. Norcarfentanil, carfentanil, and remifentanil share a neutral loss of 32 Da and 60 Da, which is noted, whereas sufentanil and alfentanil give neutral losses of 31 Da and 148 Da. In the case of alfentanil the neutral loss of 31 Da is not observed because that particular product ion's secular frequency (114 kHz) is within 10 kHz of the precursor ion's frequency (105 kHz) and so is not ejected when it is formed. The broadband waveform could, in principle, be altered to eject ions closer in frequency to the precursor ion, but this risks premature excitation and ejection of the precursor ions.

Figure 4:
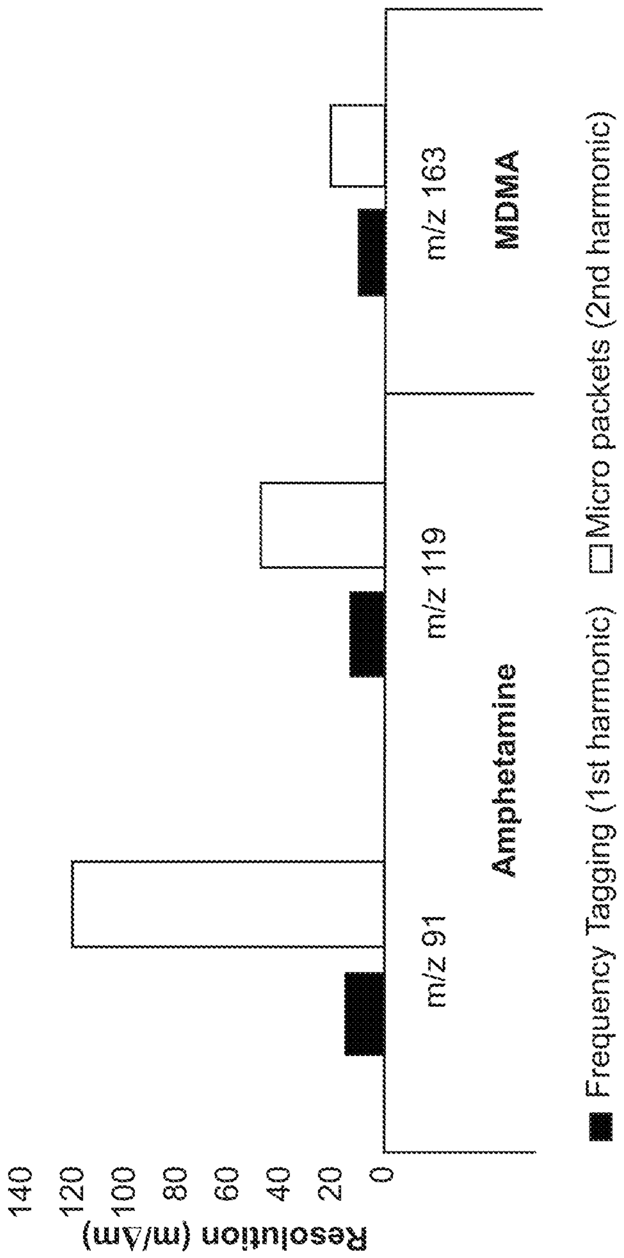
FIG. 4 shows a product ion resolution comparison between 2D MS using frequency tagging (blue, 1st harmonic) and the ion micropacket method (2nd harmonic). FWHM=full width at half maximum.

One of the primary motivations for measuring the ejection frequency of the product ions at the detector is to improve the resolution of our previous 'frequency tagging' 2D MS method. In 'frequency tagging' low kHz beat frequencies were observed in the mass spectral peaks at the detector, with mass resolutions (m/Δm) of 15 and 13 for m/z 91 and m/z 119 of amphetamine and 10 for m/z 163 of MDMA (FIG. 4). In order to improve the resolution, either the beats must be measured for a longer period of time (i.e. the mass spectral resolution must worsen), or a higher frequency must be measured. Conveniently, the ion micropacket method measures frequencies that are hundreds of kHz and thus should return higher resolution than the frequency tagging method. For m/z 91 and m/z 119 of amphetamine, much improved mass resolutions of 120 and 48 were obtained, and for MDMA the resolution of m/z 163 was increased to 20.6. We do note that these resolution values are likely fundamentally limited by ion secular frequency bandwidths and off-resonance excitation effects. Moreover, the product ions are distributed over Mathieu q space when they are formed and ejected so that higher mass resolution will almost always be obtained for the lower m/z product ions which have greater frequency dispersions in the ion trap than higher m/z ions. Even so, it may be possible to improve the frequency resolution further by improving the phasing of the broadband ejection waveform or by optimizing the amplitude of the waveform.

A second advantage of the micropacket method over the frequency tagging method is that less overlap is observed in the frequency spectra. This is especially notable for the fentanyls which showed 6 peaks over a 10 kHz frequency range using frequency tagging but only two peaks (the secular frequency and second harmonic) over a 1 MHz range in the micropacket method. The third harmonic was not observed because it would not satisfy the Nyquist criterion of the data acquisition system.

There are multiple considerations when using these methods. First, detection of the micropackets requires faster and more sensitive detection electronics, particularly the current amplifier, in order to measure signals that are hundreds of kHz instead of tens of kHz or less.

Figure 5:
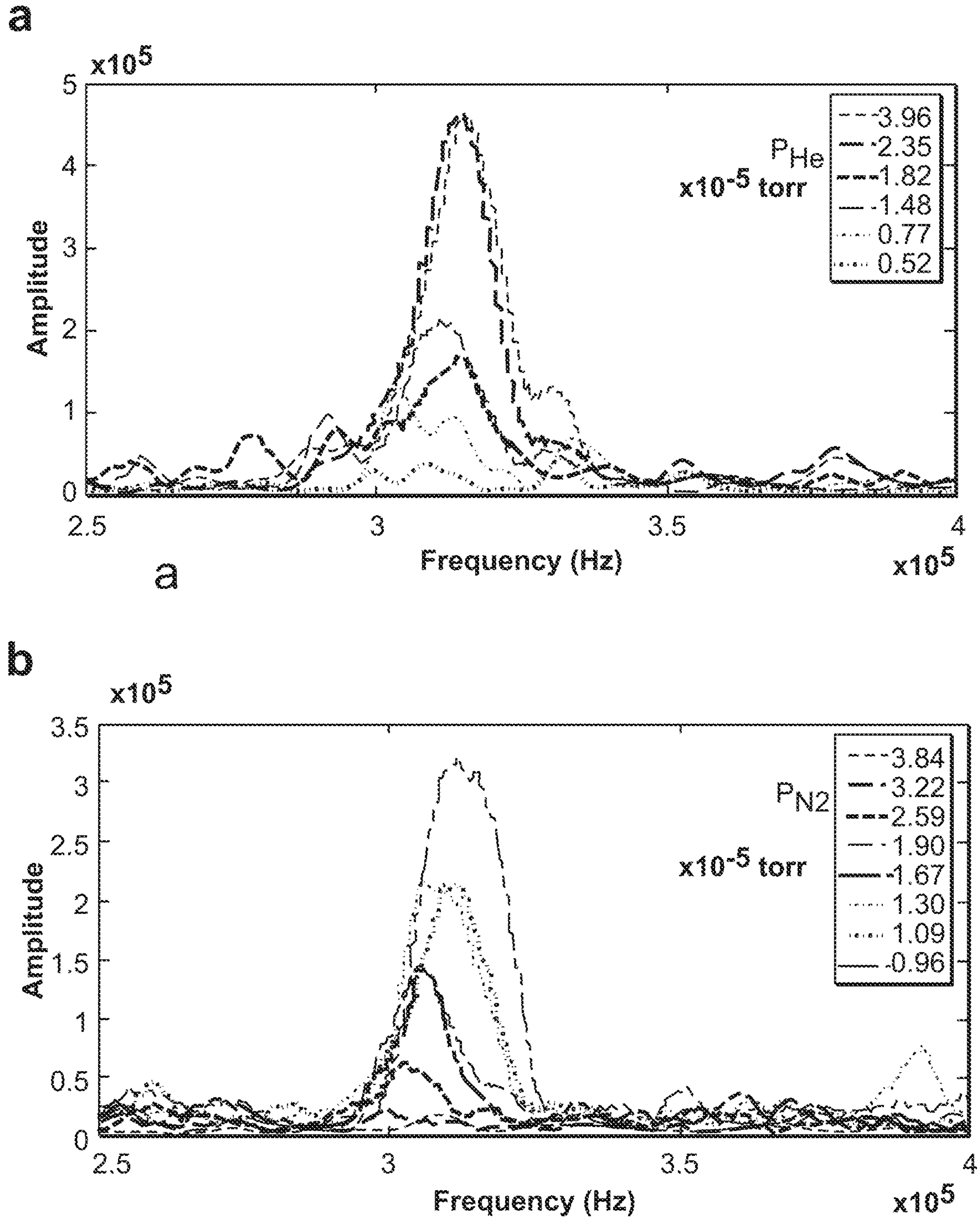
FIG. 5 panels A-B show effect of (panel A) helium and (panel B) nitrogen pressure on the FFT of m/z 136 in FIG. 2 panel B. The frequency spectra were smoothed using a 50-point moving average.

Second, the ion phase with respect to the ac waveform must be carefully controlled. The ion micropacket technique works best if the ion micropackets are ejected at regularly spaced intervals, that is, if the ions do not get dephased through irregularities in the waveforms or through collisions with the background gas. FIG. 5 panel A is a plot of the peak at ~300 kHz in FIG. 2 panel B (precursor ion m/z 136, product ion m/z 119) at various helium pressures. These spectra were digitally filtered using a 50-point moving average; the beats in the smoothed peaks are observed because there is a peak in the FFT every 1 kHz (due to the 1 kHz spacing in the broadband waveform). At low helium pressure (e.g. $0.52\times10^{-5}$ torr), very little fragmentation is observed so that the frequency spectrum is blank because very few micropackets are measured. As the pressure increases, several effects are evident. First, the observed frequency shifts up, which has been attributed by Whitten et al. (J. M. Rapid Commun Mass Spectrom 2004, 18, 1749-1752) to the addition of a drag term to the equations of motion, shifting the ions' Mathieu a and q parameters and thus their secular frequencies. In nitrogen (FIG. 5 panel B), the apparent frequency shifted higher as the pressure decreased, which implies that factors other than drag are responsible for the shift. Also notable is that at higher pressures in helium, the product ion intensities increased, presumably due to greater fragmentation efficiency. In nitrogen, on the other hand, higher pressures led to decreased intensity in the FFT due to ion dephasing.[10-12] Although the overall ion current decreased ~25% from the lowest pressure to the highest-pressure spectrum, this cannot account for the entire loss of frequency information. Instead, the more scattering collisions with nitrogen must knock the ions out of phase with the frequencies in the broadband waveform, causing a loss of frequency information. Helium is light enough that, even at the higher-pressure settings, frequency information was not lost. FT-ICRs experience more pronounced phase shift problems and instead use other dissociation methods such as IRMPD and ECD to keep the background pressure low.[12-15] Similar techniques could similarly benefit 2D MS in quadrupole ion traps.

While exemplified using CID, the skilled artisan will appreciate that covers multiple different dissociation techniques, such as surface-induced dissociation, IRMPD (infrared multiphoton dissociation), UVPD (ultraviolet photodissociation), ECD (electron capture dissociation), and ETD (electron transfer dissociation). The skilled artisan will appreciate that this list is exemplary and non-exclusive and that any dissociation technique is applicable with the systems and methods of the invention. For example, due to ion dephasing effects, it may be desirable to implement an alternative method of dissociation instead of CID. For example, infrared multiphoton dissociation is used in ICR 2D MS for this very reason and may also be suitable for the quadrupole ion trap.

Inverse Mathieu q Scan

An inverse Mathieu q scan is described in U.S. application Ser. No. 15/789,688, the content of which is incorporated by reference herein in its entirety. An inverse Mathieu q scan operates using a method of secular frequency scanning in which mass-to-charge is linear with time. This approach contrasts with linear frequency sweeping that requires a complex nonlinear mass calibration procedure. In the current approach, mass scans are forced to be linear with time by scanning the frequency of a supplementary alternating current (supplementary AC) so that there is an inverse relationship between an ejected ion's Mathieu q parameter and time. Excellent mass spectral linearity is observed using the inverse Mathieu q scan. The rf amplitude is shown to control both the scan range and the scan rate, whereas the AC amplitude and scan rate influence the mass resolution. The scan rate depends linearly on the rf amplitude, a unique feature of this scan. Although changes in either rf or AC amplitude affect the positions of peaks in time, they do not change the mass calibration procedure since this only requires a simple linear fit of m/z vs time. The inverse Mathieu q scan offers a significant increase in mass range and power savings while maintaining access to linearity, paving the way for a mass spectrometer based completely on AC waveforms for ion isolation, ion activation, and ion ejection.

Methods of scanning ions out of quadrupole ion traps for external detection are generally derived from the Mathieu parameters $a_u$ and $q_u$, which describe the stability of ions in quadrupolar fields with dimensions u. For the linear ion trap with quadrupole potentials in x and y, $$q_x=-q_y=8zeV_{0\text{-}p}/\Omega^2(x_0^2+y_0^2)m \tag{1}$$

$$a_x=-a_y=16zeU/\Omega^2(x_0^2+y_0^2)m \tag{2}$$

where z is the integer charge of the ion, e is the elementary charge, U is the DC potential between the rods, $V_{0\text{-}p}$ is the zero-to-peak amplitude of the quadrupolar radiofrequency (rf) trapping potential, Ω is the angular rf frequency, $x_0$ and $y_0$ are the half distances between the rods in those respective dimensions, and m is the mass of the ion. When the dimensions in x and y are identical ($x_0=y_0$), $2r_0^2$ can be substituted for ($x_0^2+y_0^2$). Solving for m/z, the following is obtained:

$$m/z=4V_{0\text{-}p}/q_x\Omega^2 r_0^2 \tag{3}$$

$$m/z=8U/a_x\Omega^2 r_0^2 \tag{4}$$

Ion traps are generally operated without DC potentials ($a_u$=U=0) so that all ions occupy the q axis of the Mathieu stability diagram. In the boundary ejection method, first demonstrated in the 3D trap and in the linear ion trap, the rf amplitude is increased so that ions are ejected when their trajectories become unstable at q=0.908, giving a mass spectrum, i.e. a plot of intensity vs m/z since m/z and rf amplitude (i.e. time) are linearly related.

The basis for an inverse Mathieu q scan is derived from the nature of the Mathieu parameter $q_u$ (eq. 3). In order to scan linearly with m/z at constant rf frequency and amplitude, the $q_u$ value of the m/z value being excited should be scanned inversely with time t so that $$q_u=k/(t-j) \tag{5}$$

where k and j are constants determined from the scan parameters. In the mode of operation demonstrated here, the maximum and minimum $q_u$ values ($q_{max}$ and $q_{min}$), which determine the m/z range in the scan, are specified by the user. Because the inverse function does not intersect the q axis (e.g. $q_u$=1/t), the parameter j is used for translation so that the first q value is $q_{max}$. This assumes a scan from high q to low q, which will tend to give better resolution and sensitivity due to the ion frequency shifts mentioned above.

The parameters j and k are calculated from the scan parameters, $$j=q_{min}\Delta t/(q_{min}-q_{max}) \tag{6}$$

$$k=-q_{max}j \tag{7}$$

where Δt is the scan time. Operation in Mathieu q space gives advantages: 1) the waveform frequencies depend only on the rf frequency, not on the rf amplitude or the size or geometry of the device, which implies that the waveform only has to be recalculated if the rf frequency changes (alternatively, the rf amplitude can compensate for any drift in rf frequency), and 2) the mass range and scan rate are controlled by the rf amplitude, mitigating the need for recalculating the waveform in order to change either parameter. It is important to note that we purposely begin with an array of $q_u$ values instead of m/z values for these very reasons.

Once an array of Mathieu $q_u$ values is chosen, they are converted to secular frequencies, which proceeds first through the calculation of the Mathieu $\beta_u$ parameter, $$\beta_u^2 = a_u + \cfrac{q_u^2}{(\beta_u+2)^2 - a_u - \cfrac{q_u^2}{(\beta_u+4)^2 - a_u - \cfrac{q_u^2}{(\beta_u+6)^2 - a_u - \ldots}}} + \cfrac{q_u^2}{(\beta_u-2)^2 - a_u - \cfrac{q_u^2}{(\beta_u-4)^2 - a_u - \cfrac{q_u^2}{(\beta_u-6)^2 - a_u - \ldots}}} \tag{8}$$

a conversion that can be done by using the algorithm described in Snyder et al. (Rapid Commun. Mass Spectrom. 2016, 30, 1190), the content of which is incorporated by reference herein in its entirety. The final step is to convert Mathieu $\beta_u$ values to secular frequencies (eqns. 9, 10) to give applied AC frequency vs time. Each ion has a set of secular frequencies, $$\omega_{u,n}=|2n+\beta_u|\Omega/2 \quad -\infty<n<\infty \tag{9}$$

where n is an integer, amongst which is the primary resonance frequency, the fundamental secular frequency, $$\omega_{u,0}=\beta_u\Omega/2 \tag{10}$$

This conversion gives an array of frequencies for implementation into a custom waveform calculated in a mathematics suite (e.g. Matlab).

Prior work used a logarithmic sweep of the AC frequency for secular frequency scanning, but, as described here, the relationship between secular frequency and m/z is not logarithmic, resulting in very high mass errors during mass calibration.

In theory, once the Mathieu $q_u$ parameters are converted to secular frequencies, a waveform is obtained. However, this waveform should not be used for secular frequency scanning due to the jagged edges observed throughout the waveform (i.e. phase discontinuities). In the mass spectra, this is observed as periodic spikes in the baseline intensities. Instead, in order to perform a smooth frequency scan, a new parameter Φ is introduced. This corresponds to the phase of the sinusoid at every time step (e.g. the $i^{th}$ phase in the waveform array, where i is an integer from 0 to v*Δt−1). Instead of scanning the frequency of the waveform, the phase of the sinusoid is instead scanned in order to maintain a continuous phase relationship. The relationship between ordinary (i.e. not angular) frequency f and phase Φ is:

$$f(t)=(\tfrac{1}{2}\pi)(d\Phi/dt)(t) \quad (11)$$

so that $$\Phi(t)=\Phi(0)+2\pi\int_0 f(\tau)d\tau \quad (12)$$

where variable τ has been substituted for time t in order to prevent confusion between the integration limit t and the time variable in the integrand. Thus, the phase of the sine wave at a given time t can be obtained by integrating the function that describes the frequency of the waveform as a function of time, which was previously calculated.

We begin with the phase of the waveform set equal to zero:

$$\Phi(0)=0(t=0) \quad (13)$$

The phase is then incremented according to eqns. 14 and 15, which accumulates (integrates) the frequency of the sinusoid, so that $$\Delta=\omega_{u,0}/v \quad (14)$$

$$\Phi(i+1)=\Phi(i)+\Delta \quad (15)$$

where v is the sampling rate of the waveform generator. Note that $\omega_{u,0}$ is the angular secular frequency ($2*\pi*f_{u,0}$, where $f_{u,0}$ is the ordinary secular frequency in Hz) in units of radians/sec.

Thus, sweeping through phase ((FIG. 1D) instead of frequency gives a smooth frequency sweep.

Because the relationship between secular frequency and time is approximately an inverse function, the phase will be swept according to the integral of an inverse function, which is a logarithmic function. However, because the relationship between secular frequency and m/z is only approximately an inverse relationship, the phase Φ will deviate from the log function and thus cannot be described analytically (due to eq. 8).

Ion Traps and Mass Spectrometers

Any ion trap known in the art can be used in systems of the invention. Exemplary ion traps include a hyperbolic ion trap (e.g., U.S. Pat. No. 5,644,131, the content of which is incorporated by reference herein in its entirety), a cylindrical ion trap (e.g., Bonner et al., International Journal of Mass Spectrometry and Ion Physics, 24(3):255-269, 1977, the content of which is incorporated by reference herein in its entirety), a linear ion trap (Hagar, Rapid Communications in Mass Spectrometry, 16(6):512-526, 2002, the content of which is incorporated by reference herein in its entirety), and a rectilinear ion trap (U.S. Pat. No. 6,838,666, the content of which is incorporated by reference herein in its entirety).

Any mass spectrometer (e.g., bench-top mass spectrometer of miniature mass spectrometer) may be used in systems of the invention and in certain embodiments the mass spectrometer is a miniature mass spectrometer. An exemplary miniature mass spectrometer is described, for example in Gao et al. (Anal. Chem. 2008, 80, 7198-7205.), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 $m^3$/hr) diaphragm pump and a 11 L/s turbo pump for the system described in Gao et al. Other exemplary miniature mass spectrometers are described for example in Gao et al. (Anal. Chem., 2008, 80, 7198-7205.), Hou et al. (Anal. Chem., 2011, 83, 1857-1861.), and Sokol et al. (Int. J. Mass Spectrom., 2011, 306, 187-195), the content of each of which is incorporated herein by reference in its entirety.

Figure 6:
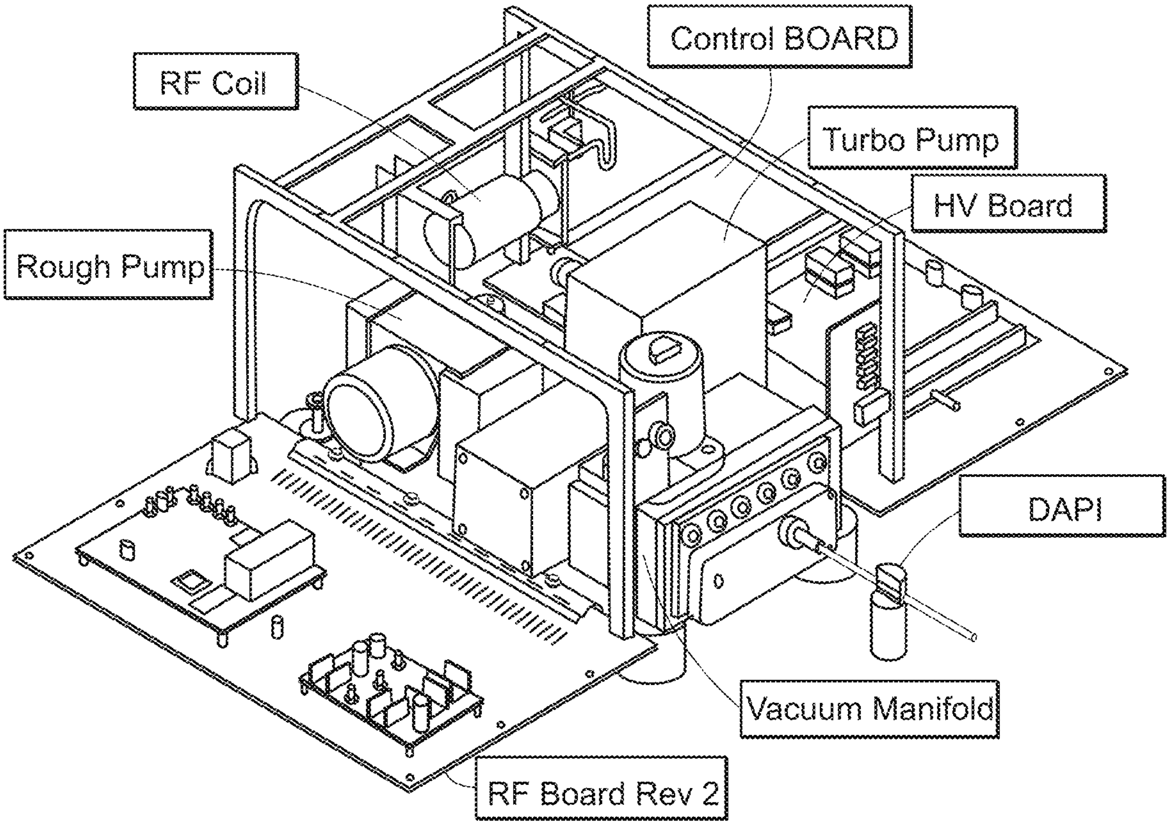
FIG. 6 is a picture illustrating various components and their arrangement in a miniature mass spectrometer.

FIG. 6 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 7. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

Ionization Sources

In certain embodiments, the systems of the invention include an ionizing source, which can be any type of ionizing source known in the art. Exemplary mass spectrometry techniques that utilize ionization sources at atmospheric pressure for mass spectrometry include paper spray ionization (ionization using wetted porous material, Ouyang et al., U.S. patent application publication number 2012/0119079), electrospray ionization (ESI; Fenn et al., Science, 1989, 246, 64-71; and Yamashita et al., J. Phys. Chem., 1984, 88, 4451-4459.); atmospheric pressure ionization (APCI; Carroll et al., Anal. Chem. 1975, 47, 2369-2373); and atmospheric pressure matrix assisted laser desorption ionization (AP-MALDI; Laiko et al. Anal. Chem., 2000, 72, 652-657; and Tanaka et al. Rapid Commun. Mass Spectrom., 1988, 2, 151-153,). The content of each of these references is incorporated by reference herein in its entirety.

Exemplary mass spectrometry techniques that utilize direct ambient ionization/sampling methods include desorption electrospray ionization (DESI; Takats et al., Science, 2004, 306, 471-473, and U.S. Pat. No. 7,335,897); direct analysis in real time (DART; Cody et al., Anal. Chem., 2005, 77, 2297-2302.); atmospheric pressure dielectric barrier discharge Ionization (DBDI; Kogelschatz, Plasma Chemistry and Plasma Processing, 2003, 23, 1-46, and PCT international publication number WO 2009/102766), and electrospray-assisted laser desorption/ionization (ELDI; Shiea et al., J. Rapid Communications in Mass Spectrometry, 2005, 19, 3701-3704.). The content of each of these references in incorporated by reference herein its entirety.

System Architecture

Figure 7:
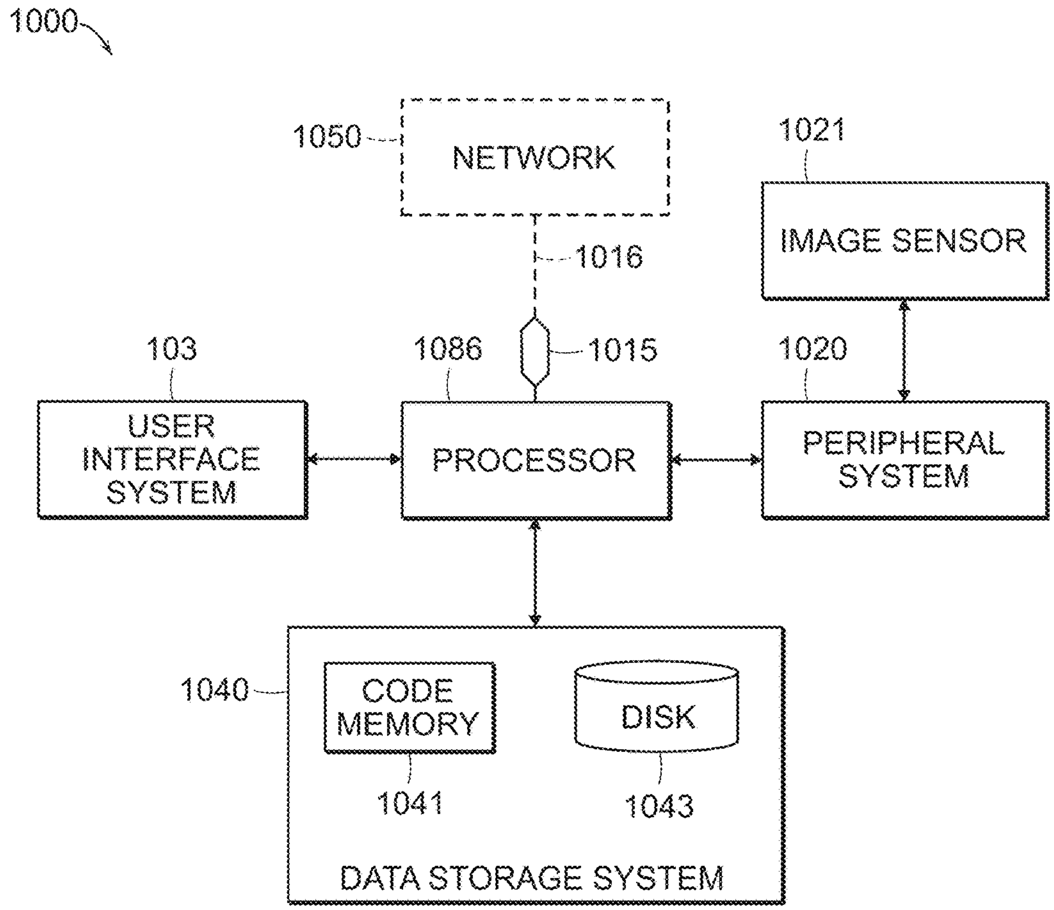
FIG. 7 shows a high-level diagram of the components of an exemplary data-processing system for analyzing data and performing other analyses described herein, and related components.

FIG. 7 is a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The data described above may be obtained using detector 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 which in one embodiment may be capable of real-time calculations (and in an alternative embodiment configured to perform calculations on a non-real-time basis and store the results of calculations for use later) can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (e.g., a tablet) connected, e.g., via a network or a null-modem cable, or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), Universal Serial Bus (USB) interface memory device, erasable programmable read-only memories (EPROM, EEPROM, or Flash), remotely accessible hard drives, and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors) to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Discontinuous Atmospheric Pressure Interface (DAPI) In certain embodiments, the systems of the invention can be operated with a Discontinuous Atmospheric Pressure Interface (DAPI). A DAPI is particularly useful when coupled to a miniature mass spectrometer, but can also be used with a standard bench-top mass spectrometer. Discontinuous atmospheric interfaces are described in Ouyang et al. (U.S. Pat. No. 8,304,718 and PCT application number PCT/US2008/065245), the content of each of which is incorporated by reference herein in its entirety.

Samples

A wide range of heterogeneous samples can be analyzed, such as biological samples, environmental samples (including, e.g., industrial samples and agricultural samples), and food/beverage product samples, etc.

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal. Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 μm porosities. Samples containing colloidal material or a large amount of fine particulates, considerable pressure may be required to force the liquid sample through the filter. Accordingly, for samples such as soil extracts or wastewater, a pre-filter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed to determine the concentration of one or more target analytes, such as elements within a blood plasma sample. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected using methods of the invention. More particularly, methods of the invention can be used to detect molecules in a biological sample that are indicative of a disease state.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1: Materials and Methods

Chemicals: Standards were purchased from Cerilliant (Round Rock, TX, USA) and were diluted in 50:50 methanol/water with 0.1% formic acid to ~5 ppm (g/mL) concentration.

Instrumentation: All ions were generated using nanoelectrospray ionization with a 1.5 kV potential. Data was generated on a Thermo LTQ linear quadrupole ion trap (San Jose, CA, USA), described in Schwartz et al. (J Am Soc Mass Spectrom 2002, 13, 659-669), for example at FIGS. 1 and 4, the content of which is incorporated by reference herein in its entirety. The LTQ ion trap has rf frequency 1.166 MHz, radial dimensions of $x_0$=4.75 mm and $y_0$=4 mm, and three axial rod sections of length 12, 37, and 12 mm. The rf voltage was held constant throughout the mass scan period to prevent the ions' secular frequencies from changing during the scan. Helium was usually used as bath gas at an ion gauge reading of $1.3\times10^{-5}$ torr. Some experiments were performed with nitrogen bath gas.

Low voltage AC waveforms supplied by two Keysight 33612A function generators (Chicago, IL, USA) were coupled onto the x and y rods of the linear ion trap as described previously (Snyder, D. T.; Cooks, R. G. J. Am. Soc. Mass Spectrom. 2017, 28, 1929-1938; and Snyder, D. T.; Cooks, R. G. Anal. Chem. 2017, 89, 8148-8155, the content of each of which is incorporated by reference herein in its entirety). A first waveform was an inverse Mathieu q scan from q=0.908 to q=0.15 over 600 ms applied on the y rods to excite and fragment precursor ions. A second waveform was a broadband sum of sines constructed in Matlab and applied to the x electrodes (the detection dimension). This waveform is used to simultaneously eject all product ions of the excited precursor ions. Frequencies were equally spaced (1 kH spacing) from 583 kHz to 62 kHz and their phases were distributed quadratically with frequency (Guan, S. J. Chem. Phys. 1989, 91, 775-777, the content of which is incorporated by reference herein in its entirety). The broadband waveform was built point-by-point so that the frequency components included in each point were always at least 10 kHz above the corresponding frequency in the accompanying inverse Mathieu q scan since each precursor ion has a different product ion mass range (and thus will have a different product ion frequency range). In other words, each time point in the broadband waveform consisted of a different set of frequencies to coincide with different product ion mass ranges.

Data acquisition and analysis: Data were obtained directly from the electron multipliers of the LTQ using a combination of a fast transimpedance (current) amplifier and either a Keysight MSOX3024T oscilloscope (Chicago, IL, USA) or a National Instruments USB-6343 DAQ device with BNC termination (Austin, TX, USA). The amplifier consists of a current to voltage conversion followed by a two-stage current feedback operational amplifier (CFA) circuit. The CFAs allow the circuit to achieve a very high gain without the linear tradeoff in bandwidth, as with traditional voltage feedback operational amplifiers. The total gain of the circuit is around 3,000,000 V/A with a bandwidth of 225 MHz. The oscilloscope was generally operated with a sampling rate between 50 and 100 MHz and acquired ~1.9 ms of data (but could only save 16,000 points of data), whereas the DAQ device had a fixed sampling rate of 2 MHz and could acquire and save data over 600 ms (1.2 million points). Fast Fourier transforms (FFTs) of the oscilloscope data (16,000 points over 1.9 ms) were conducted in Matlab, whereas Labview was used to obtain FFTs of DAQ data (using 10 ms windows containing 20,000 points each). All spectra are the average of 20 scans.

Example 2: Two-Dimensional Mass Spectrometry on a Linear Quadrupole Ion Trap A two-dimensional tandem mass spectrometry (2D MS/MS) scan has been developed for the linear quadrupole ion trap. Precursor ions are mass-selectively excited using a nonlinear ac frequency sweep at constant rf voltage while, simultaneously, all product ions of the excited precursor ions are ejected from the ion trap using a time-varying broadband waveform. The fragmentation time of the precursor ions correlates with the precursor m/z value (the first mass dimension) and also with the ejection time of the product ions, allowing the correlation between precursor and product ions. Additionally, the second mass dimension (product ions' m/z values) is recovered through fast Fourier transform of each mass spectral peak, revealing either intentionally-introduced 'frequency tags' or the product ion micropacket frequencies, both of which can be converted to product ion m/z, thereby revealing a product ion mass spectrum for every precursor ion. We demonstrate the utility of this method for analyzing structurally related precursor ions, including chemical warfare agent simulants, fentanyls and other opioids, amphetamines, cathinones, antihistamines, and tetracyclic antidepressants.

Introduction

Two-dimensional mass spectrometry (2D MS/MS) is a method for correlating precursor ions and product ions without isolation of the former. Its origin can be traced to a 1987 paper by Pfändler et al. in which it was proposed to be useful for studying ion/molecule collisions via a series of rf pulses and delay/reaction times in a Fourier transform ion cyclotron resonance (FT-ICR) cell. Subsequently, Guan and Jones described the theory of 2D MS/MS in ICRs and Pfändler provided the first experimental evidence for precursor-product ion correlations using ion/molecule reactions. Experimentally, 2D MS/MS in ICRs requires an excitation pulse (a frequency sweep), a varied time delay, and an encoding pulse identical to the excitation pulse, followed by a conventional detection pulse, after which the induction current is measured and ion m/z obtained from the Fourier transform of the detected transient. As the time delay is varied between pulse sequences (each requiring a new ion injection), the abundance of fragment ions varies periodically according to the cyclotron frequency of the precursor ions because the encoding pulse will have a different phase relationship with respect to each precursor ion m/z and will thus excite some ions but de-excite others. This causes some precursor ions to fragment more than others if a radius-dependent activation mode is used (IRMPD, for example). Because each precursor ion m/z has a different cyclotron frequency, the periodicity of the product ion abundances (with respect to the time delay) generated from different precursor ions will also be unique. The product ion m/z values are obtained from FFTs of the detected transients, whereas the precursor ion m/z values are determined from FFT of product ion abundance vs. delay time.

Other advances include new pulse sequences using stored waveform inverse Fourier transform (SWIFT) for ion radius modulation and denoising algorithms for data analysis. More recently van Agthoven and coworkers have proposed an optimized pulse sequence in which two encoding pulses with optimized voltage amplitudes are separated by a delay time, and after the second pulse the ion signal is observed during the detection period. In addition, others have demonstrated increased precursor ion resolution using nonuniform sampling. Usually infrared multiphoton dissociation is used for fragmentation but several implementations have used electron capture dissociation. After decades of development, 2D MS in FT-ICRs is finding extensive use in applications for analysis of small molecule biologics (cholesterol), peptides and glycopeptides, proteins, and polymers. Even so, 2D MS in ICRs still faces multiple challenges: limited precursor ion resolution (requiring overnight runs to obtain unit precursor ion mass resolution), high sample consumption (one injection per time delay increment because fragmentation is irreversible), and loss of resolution during collision-induced dissociation (hence, laser-based methods are prominent).

To date, 2D MS/MS has only been experimentally demonstrated on FT-ICR instruments; it has yet to garner theoretical or experimental interest in the arguably similar—and much cheaper, simpler, and feasible for miniaturization—quadrupole ion trap (QIT). This is an odd omission given that many waveform methods (e.g. SWIFT, frequency 'chirps') that originated on ICRs were successfully translated to quadrupole traps. After all, both ICRs and QITs are ion frequency analyzers with MS/MS capabilities, although the QIT is indirectly so (the ions' frequencies are indirectly measured via resonance ejection at a fixed frequency, whereas in the ICR the frequencies are measured directly via ion excitation and charge detection). Simulated evidence that 2D MS is possible in a linear ion trap has been published by O'Connor's group. In these simulations, SWIFT was used to radially excite ions as a laser pulse fragmented ions at the center (the un-modulated ions). According to the work, the intensities of product ions were modulated corresponding to the secular frequency of the excited precursors, as is the case for the similar ICR experiments. Despite this simulated evidence, no experimental data of 2D MS on linear ion traps has emerged. Furthermore, the requirement of a laser for dissociation and a second mass analyzer for determination of product ion m/z limits the overall applicability of this method. Moreover, such a method would not be feasible for portable ion traps which are of interest to us and which would benefit most from the efficiency of acquiring the entire 2D MS/MS domain with, say, a single scan.

In this Example, we propose two methods for 2D MS/MS on quadrupole ion traps using simple collision-induced dissociation for precursor ion fragmentation and show experimental evidence that precursor and product ion m/z values can be obtained and correlated in a single scan. In this work we use a nonlinear frequency sweep for time-dependent fragmentation of precursor ions from low to high m/z in one dimension of the linear trap and eject all product ions of those precursor ions as they are being formed by using a broadband sum of sines waveform applied in the orthogonal dimension. In a first implementation, the sum of sines is encoded with beat frequencies proportional to the product ion secular frequencies, thus modulating peak shapes according to those beat frequencies. By taking the fast Fourier transform of each peak, the beat frequencies of the ejected product ions—hence, the product ions' secular frequencies—can be recovered for every precursor ion without isolation. Secular frequency can then be converted to ion m/z, and subsequently product ion frequency spectra can be converted to the mass domain, thereby yielding a product ion spectrum for every precursor ion. In a second implementation, the frequency spacing in the broadband waveform is even throughout and instead the product ion micropackets are observed and Fourier transformed to recover the product ions' secular frequencies and hence m/z values.

The 2D MS/MS can be thought of as conducting every possible precursor ion scan at once (or, correspondingly, every possible neutral loss or product ion scan). Experimentally, the linear ion trap 2D MS method is most similar to the precursor ion scan, which we believe will be most useful for miniature or portable instruments with low acquisition rates (e.g. DAPI systems). On such instruments data-dependent product ion scans are less feasible than data-independent acquisition. It thus may be important to be able to acquire as much data as possible in each scan, i.e. perform 2D MS/MS.

Experimental

Chemicals: All drug standards were purchased from Cerilliant (Round Rock, TX, USA) and were either used as provided or diluted in 50:50 methanol/water with 0.1% formic acid. All other standards were purchased from Sigma (St. Louis, MO, USA) and prepared similarly.

Ionization: Nanoelectrospray ionization was used for all experiments herein. In order to generate ions, 1.5 kV was applied to a nanospray electrode holder (glass size 1.5 mm), which was purchased from Warner Instruments (Hamden, CT, U.S.A.) and fitted with 0.127 mm diameter silver wire, part number 00303 (Alfa Aesar, Ward Hill, MA). Borosilicate glass capillaries (1.5 mm O.D., 0.86 mm I.D.) from Sutter Instrument Co. (Novato, CA, U.S.A.) were pulled to 2 m tip diameters using a Flaming/Brown micropipette puller (model P-97, Sutter Instrument Co.).

Instrumentation: All data was generated on a Thermo LTQ linear quadrupole ion trap (San Jose, CA, USA). The LTQ ion trap has an rf frequency of 1.166 MHz and dimensions of $x_0$=4.75 mm, $y_0$=4 mm, axial sections of length 12, 37, and 12 mm (Schwartz, J. C.; Senko, M. W.; Syka, J. E. J. Am. Soc. Mass Spectrom. 2002, 13, 659-669, the content of which is incorporated by reference herein in its entirety). In these experiments, the rf amplitude was constant throughout injection, cooling, and mass scan stages, as described previously.[22] The LTQ used in this work was previously modified to be able to apply low voltage ac signals to both the x and y rods. The helium normally used in the LTQ was substituted with nitrogen at an ion gauge reading of $1.4\times10^{-5}$ torr. Nitrogen increases fragmentation efficiency but also decreases resolution.

Waveform Generation: Two waveforms were used in these experiments; both were calculated in Matlab (Mathworks, Natick, MA, USA), exported as .csv files and imported into one of two Keysight 33612A arbitrary waveform generators (purchased from Newark element 14, Chicago, IL, USA) with 64 megasample memory upgrades. One generator supplied the waveform for precursor ion excitation in the y dimension while the other supplied a broadband sum of sines for product ion ejection in the x dimension.

A first waveform was a frequency sweep applied in the y dimension of the LTQ ion trap in order to mass-selectively fragment precursor ions as a function of time. The frequency sweep was an inverse Mathieu q scan (nonlinear frequency sweep with linear mass scale vs. time) from Mathieu q=0.908 to q=0.15 over 600 ms (Snyder, D. T.; Pulliam, C. J.; Cooks, R. G. Rapid Commun. Mass Spectrom. 2016, 30, 2369-2378, the content of which is incorporated by reference herein in its entirety). This excitation sweep always had a peak-to-peak amplitude of 350 mVpp. A second waveform, described next, was a broadband used to eject product ions.

Figure 8:
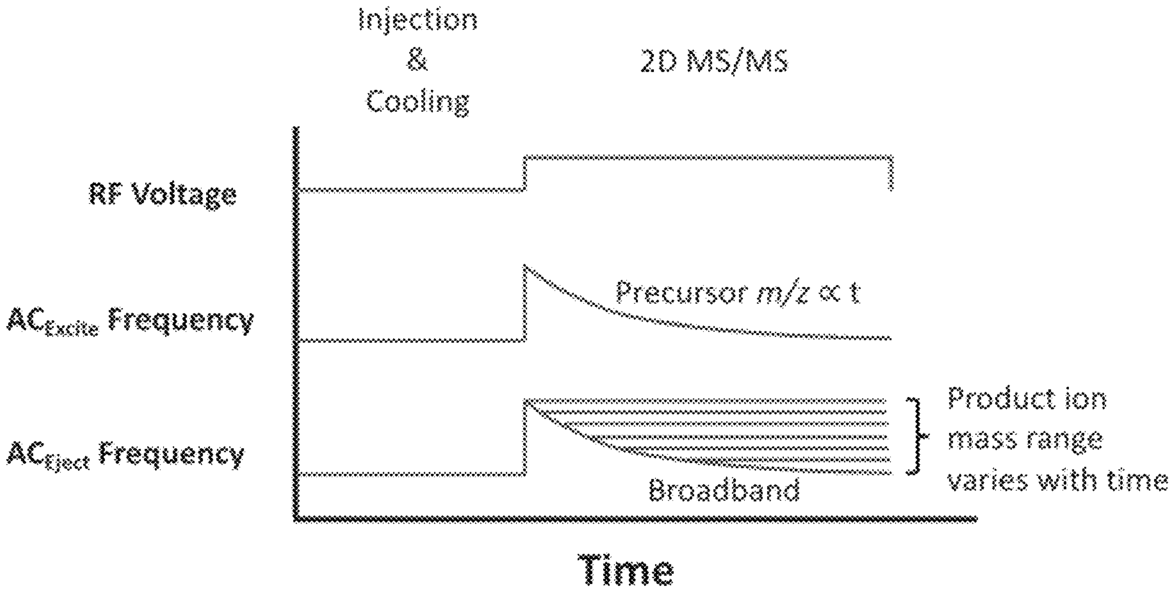
FIG. 8 is a scan table for 2D MS/MS in a linear ion trap. The rf voltage is held constant during the scan while a nonlinear ac frequency sweep, ACExcite, fragments precursor ions selectively as a function of time in the y dimension of the ion trap. Simultaneously, a broadband ACEject waveform is applied in the x dimension to eject product ions into the detectors.

Scan table: A general scan table for the 2D MS/MS experiment is shown in FIG. 8. Ions were first injected and cooled to the center of the trap through collisions with background gas molecules. The rf was set at a constant desired level for injection, cooling, and the 2D MS/MS scan because of electronic constraints; however, in principle one would leave the rf voltage low during injection/cooling and raise it for the 2D MS/MS scan as shown in FIG. 8. After cooling, a dipolar inverse Mathieu q scan was applied to the y dimension of the linear ion trap to mass-selectively fragment precursor ions such that $m/z \propto t$. Simultaneously, in the x dimension of the trap (where there are slits in the electrodes and two electron multiplier detectors) a broadband waveform was applied to eject all product ions of each precursor ion as they were formed. The broadband waveform is described in detail next.

Figure 9:
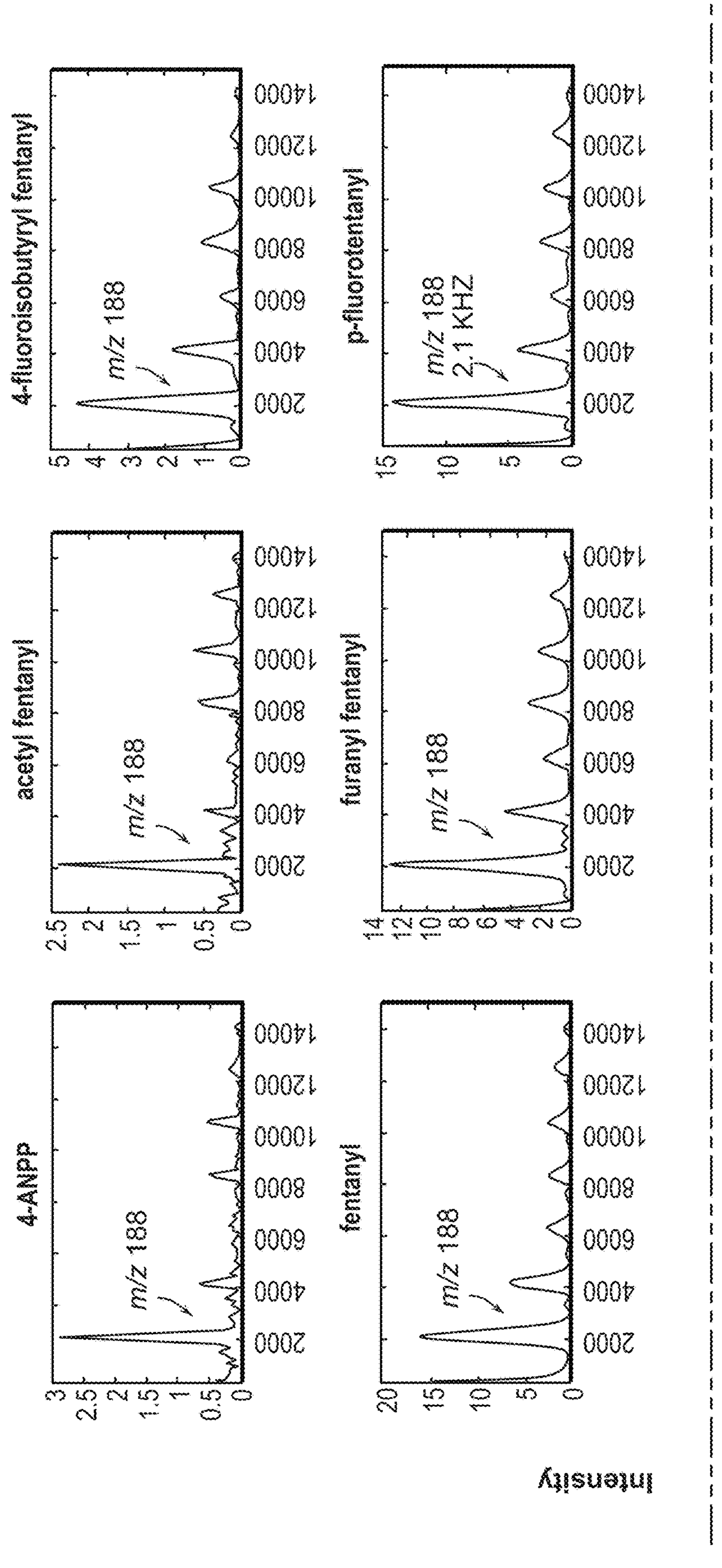
FIG. 9 shows frequency tagging spectra of various fentanyls using frequency tagging.
Figure 9:
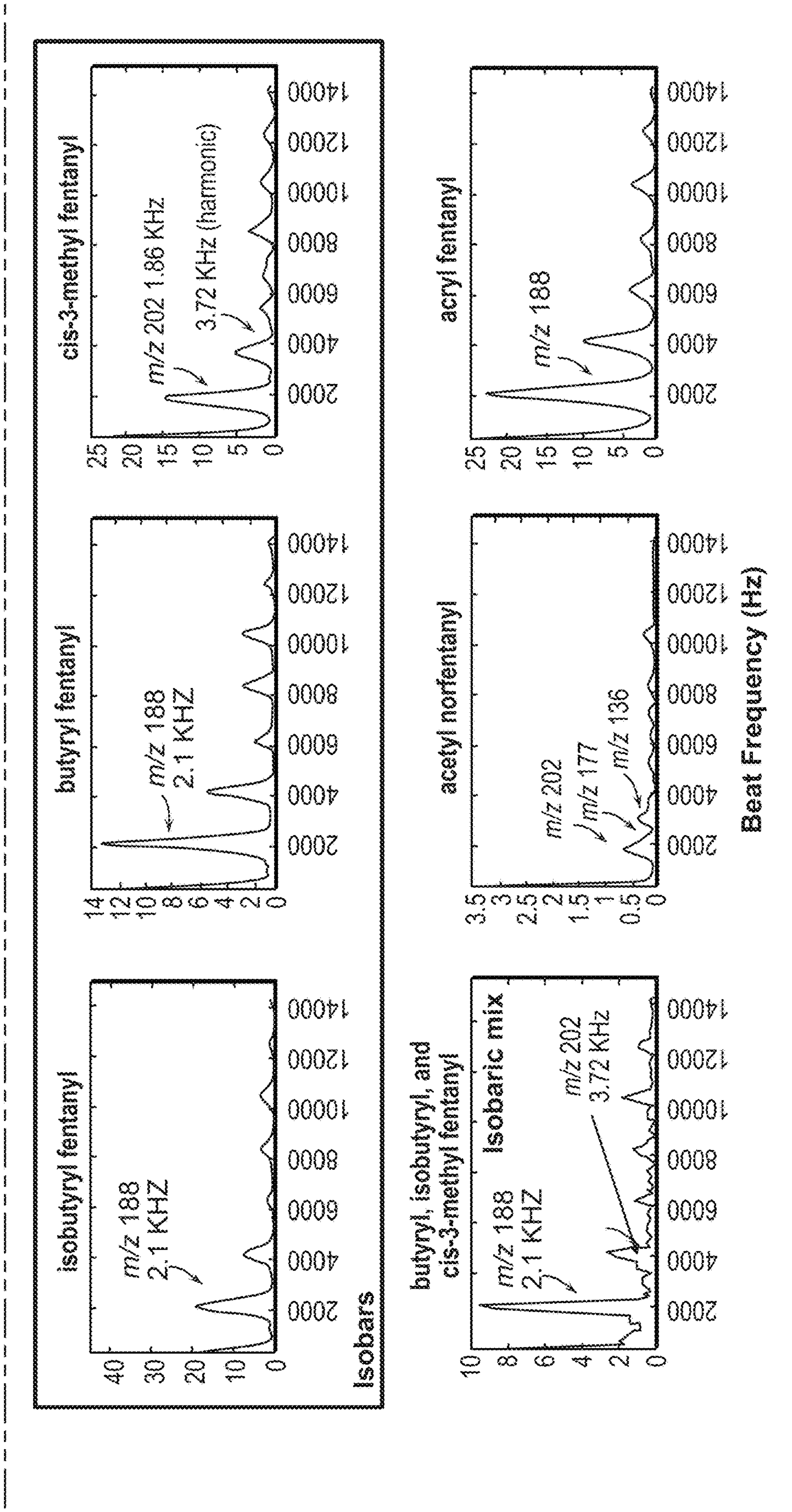

Frequency tagging: The broadband waveform, constructed using FIG. 9 and applied in the x dimension, was a broadband sum of sines used to eject all product ions of the excited precursor ions; the product ions' m/z values were encoded in the beats in the waveform so that beat frequency and product ion secular frequency were directly proportional. A master array contained main frequencies that were spaced every 10 kHz from Mathieu q=0.908 to q=0.15, with the lowest frequency being 73 kHz. Beat frequencies were then encoded by adding a second frequency per main frequency, with a starting beat frequency of 500 Hz and subsequent spacings of 600 Hz, 700 Hz, 800 Hz, etc. (i.e. the beat increased by 100 Hz per 10 kHz). The lowest main frequencies (corresponding to the highest m/z ions) had the smallest beat frequencies, and the highest main frequencies (lowest m/z ions) had the highest beat frequencies. The frequencies in the waveform were therefore 73 kHz and 73.5 kHz, 83 kHz and 83.6 kHz, 93 kHz and 93.7 kHz, and so on until half the rf frequency was met. Phase overmodulation using a quadratic function of phase vs. frequency (common with Stored Waveform Inverse Fourier Transform methods)[18,19,33] was used to maintain an approximately constant voltage amplitude (6 $V_{pp}$) as a function of time.

The ejection waveform was built point-by-point, and, in this embodiment, only frequencies at least 10 kHz above the precursor ion's frequency were included in each point. That is, the frequency components of the sum of sines waveform varied because the excited precursor ion mass varied and thus the product ion mass range (and hence frequency range) varied as a function of time. The excited precursor ion's frequency was known because it equaled the frequency applied by the excitation waveform (the inverse Mathieu q scan). For example, if at time 0.1 s the inverse Mathieu q scan was applying a frequency of 300 kHz to fragment a precursor ion, then at that time point the sum of sines waveform only included frequencies above 310 kHz.

The data collection rate in the 'normal' scan rate mode with 'high' selected as the mass range was 28.732 kHz, which is fixed by the LTQ data system and cannot be changed. All mass and frequency spectra from this method are the result of an average of 10 scans. Fast Fourier transforms were calculated in Matlab using 301 points per peak and a sampling rate of 28.732 kHz. Images were constructed using the 'imagesc' function in Matlab.

Micropacket detection: For ion micropacket detection, the frequencies of the broadband waveform were equally spaced (1 kH spacing) from 583 kHz to 62 kHz and their phases were distributed quadratically with frequency. The broadband waveform was built point-by-point so that the frequency components included in each point were always at least 10 kHz above the corresponding frequency in the accompanying inverse Mathieu q scan since each precursor ion has a different product ion mass range (and thus will have a different product ion frequency range). In other words, each time point in the broadband waveform consisted of a different set of frequencies to coincide with different product ion mass ranges.

For this method, data were obtained directly from the electron multipliers of the LTQ using a combination of a fast transimpedance (current) amplifier and either a Keysight MSOX3024T oscilloscope (Chicago, IL, USA) or a National Instruments USB-6343 DAQ device with BNC termination (Austin, TX, USA). The amplifier consisted of a current-to-voltage conversion followed by a two-stage current feedback operational amplifier (CFA) circuit. The CFAs allow the circuit to achieve a very high gain without the linear tradeoff in bandwidth, as with traditional voltage feedback operational amplifiers. The total gain of the circuit is around 200,000,000 V/A with a bandwidth of 225 MHz. The oscilloscope was operated with a sampling rate between 50 and 100 MHz and acquired ~1.9 ms of data (but could only save 16,000 points of data), whereas the DAQ device had a fixed sampling rate of 2 MHz and could acquire and save data over 600 ms (1.2 million points). Fast Fourier transforms (FFTs) of the oscilloscope data (16,000 points over 1.9 ms) were conducted in Matlab, whereas Labview was used to obtain FFTs of DAQ data (using 10 ms windows containing 20,000 points each). All spectra acquired in this mode were the average of 20 scans.

Results & Discussion

What is Frequency Tagging?

Figure 10:
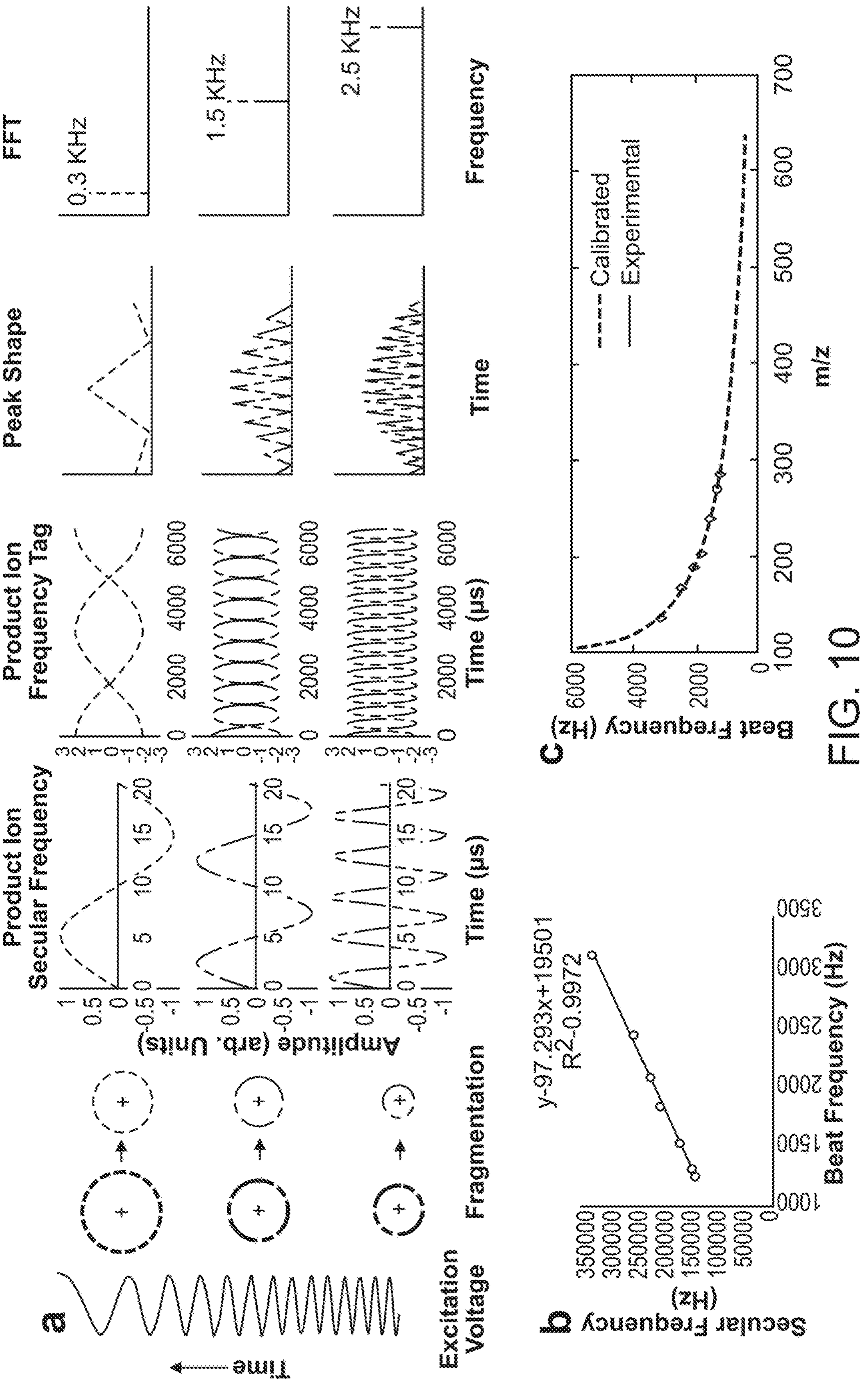
FIG. 10 panels A-C show frequency tagging mass spectrometry for 2D MS/MS. (Panel A) Precursor ions are fragmented from low to high m/z via a frequency sweep ('Excitation Voltage'), forming product ions. Each product ion is 'tagged' with a secondary frequency by resonance excitation with two frequencies close to its secular frequency, the difference of which creates a beat frequency that modulates the mass spectral peak shapes. When product ions are generated they are immediately ejected and detected by a broadband sum of sines with encoded beat frequencies, but the ejection process follows the programmed beat pattern and hence the mass spectral peaks also show beats. (Panel B) The beat frequencies, related linearly to product ion secular frequency, can be recovered by taking the fast Fourier transform of each peak. The beats can be plotted against the experimental secular frequencies for calibration. (Panel C) Experimental vs. calibrated relationship between beat frequency and product ion m/z. Note that for the micropacket technique there is no frequency tag and instead the micropacket frequencies are observed and FFT'd.

Frequency tagging (FIG. 10 panel A) is a method of tagging ions resonantly ejected from a quadrupole ion trap with a secondary frequency observable at the detector, the primary frequency being the ion's fundamental secular frequency which is usually not observed except when measuring charge induction current in the ion trap.[36] Any ion in the trap can be frequency tagged by applying a dual frequency sine wave that is the sum of the ion's secular frequency and a second frequency very close to the secular frequency. For example, an ion whose secular frequency is 300 kHz can be tagged with a 2 kHz frequency if a dual frequency sine wave containing 300 kHz and 302 kHz is used for resonance ejection (or excitation). The 2 kHz beat is observed in the mass spectral peak at the detector (FIG. 10 panel A, peak shape). A fast Fourier transform of the mass spectral peak results in recovery of the beat frequency, and if beat frequency and the secular frequency are related in some predetermined or pre-programmed (but calibratable) fashion, then this relationship can be used to relate beat frequency to product ion m/z.

In this work we used frequency tagging to perform 2D MS/MS in a linear quadrupole ion trap. There are three pieces of information obtained in a 2D MS/MS experiment: 1) precursor ion m/z, 2) product ion m/z, and 3) the relationship between the precursor ions and the product ions (i.e. from which precursor ion did each product ion originate?). In our implementation of 2D MS/MS, these three pieces of information are obtained as follows. 1) Precursor ion m/z is linearly related to time because the precursor ions are fragmented from low to high m/z using an inverse Mathieu q scan ('Excitation Voltage vs. Time' in FIG. 10 panels A-C). 2) Simultaneously, a broadband sum of sines waveform—with encoded beat frequencies for the frequency tagging technique—is used to eject the product ions as they are being formed from fragmentation of the precursors. Product ion m/z is recovered from fast Fourier transform of each mass spectral peak, where beat frequency is linearly related to secular frequency based on a pre-programmed relationship (which is then directly correlated to product ion m/z). FIG. 10 panel B shows the experimentally observed relationship between secular frequency and beat frequency, and converting secular frequency to m/z gives the plot in FIG. 10 panel C. The calibration is shown in blue and the experimental values in red. 3) Product ions are ejected from the ion trap at the same time as their respective precursor ions are fragmented and hence their relationship is preserved in time, as was the case in our implementation of precursor and neutral loss scans. The application of two waveforms, an inverse Mathieu q scan for precursor ion fragmentation and a broadband sum of sines for product ion ejection, thus allows us to obtain the entire MS/MS domain with one scan. Note that signal averaging was performed here but in principle is not required.

2D MS/MS Using Frequency Tagging

A simple mixture of 5 amphetamines (amphetamine, m/z 136; methamphetamine, m/z 150; 3,4-methylenedioxyamphetamine (mda), m/z 180; 3,4-methylenedioxymethamphetamine (mdma), m/z 194; and 3,4-methylenedioxyethylamphetamine (mdea), m/z 208) was analyzed using this 2D MS/MS method. The mass calibrated spectrum in FIG. 11 panel A gives the m/z values of the precursor ions as a function of time, thus satisfying requirement #1 of 2D MS/MS. The m/z values were directly proportional to time, giving a simple linear calibration. Note the unique beats in each peak which can be used to recover product ion m/z. It is also good to remember that although the precursor ion m/z correlates with time, the precursor ions are never detected. Only the product ions are observed at the detector.

Requirement #3, association between fragmented precursor ion m/z and generated product ion m/z, is simply inferred from time. That is, because fragment ions are ejected exactly after they are generated from fragmentation of their respective precursors (which are fragmented selectively), their relationship to each other is preserved.

In order to obtain the product ion mass spectrum for a particular precursor ion (requirement #2), we simply calculate the fast Fourier transform of each mass spectral peak and convert from observed beat frequency to secular frequency (through FIG. 10 panel B) and then to m/z using the Mathieu parameters. Experimentally this can be done by taking FFTs of peaks of known standards and correlating beat frequency with the known product ion m/z. Because in our case beat frequency and secular frequency are directly proportional, we can calculate the calibrated relationship between beat frequency and product ion m/z, as shown in FIG. 10 panel C and compare it to experimental values, shown as red diamonds. This calibration can now be used to confidently assign m/z values in the frequency spectra.

Figure 11:
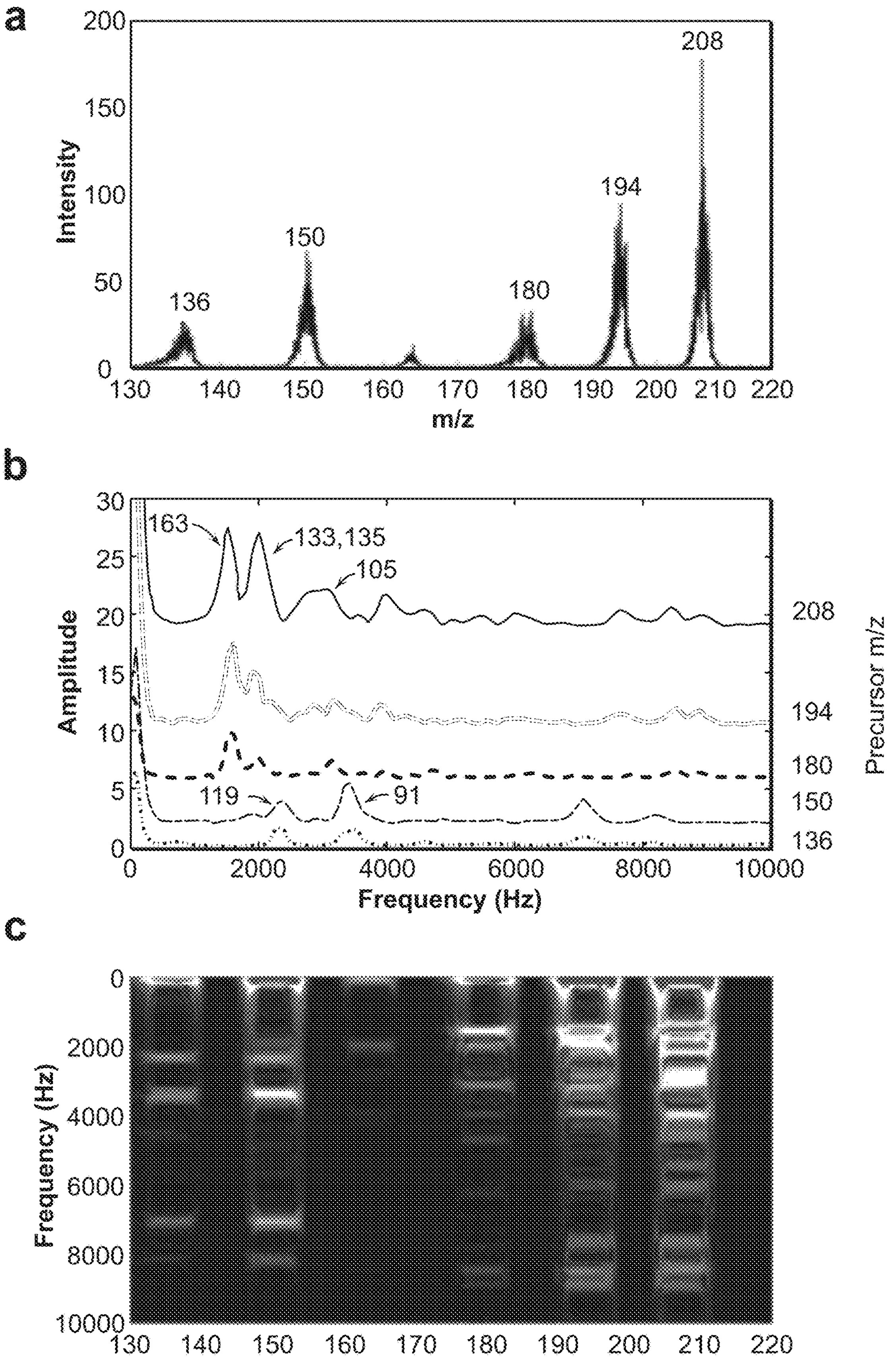
FIG. 11 panel A shows 2D MS/MS spectrum of five amphetamines using the frequency tagging technique as observed at the detectors (precursor m/z values are labelled).

Amphetamine and methamphetamine share product ions at m/z 91 and 119, and this is evident in the FFTs (FIG. 11 panel B) of the peaks in the mass spectrum (FIG. 11 panel A). A peak at 3,400 Hz corresponds to m/z 91 and 2,400 Hz corresponds to m/z 119. Because beat frequency and secular frequency are proportional in our implementation, lower m/z ions will have higher beat frequencies. Similarly, mda, mdma, and mdea fragment to m/z 163 and m/z 135/133 at 1,500 Hz and 2,000 Hz, respectively. Additional peaks in the frequency spectra correspond to harmonics (i.e. two and three times the beat frequency) as well as other beats and combination frequencies. Because of these additional peaks, frequency spectra are not converted into the mass domain. However, these peaks do serve to provide a unique pattern for each precursor ion and may be useful for distinguishing similar spectra. The total 2D MS/MS domain can be constructed by moving across the spectrum in FIG. 11 panel A and taking FFTs over a certain bin size (here, 300 data points) as we move from low to high m/z, displayed as FIG. 11 panel C. The product ion spectra in panel (b) can be thought of as being 'extracted' from the total data domain in panel (c). Note the remarkable similarities in amphetamine and methamphetamine as well as mda, mdma, and mdea, even for frequencies which are difficult to assign to product ions (e.g. >6 kHz).

2D MS/MS for Analysis of Fentanyls

Figure 12:
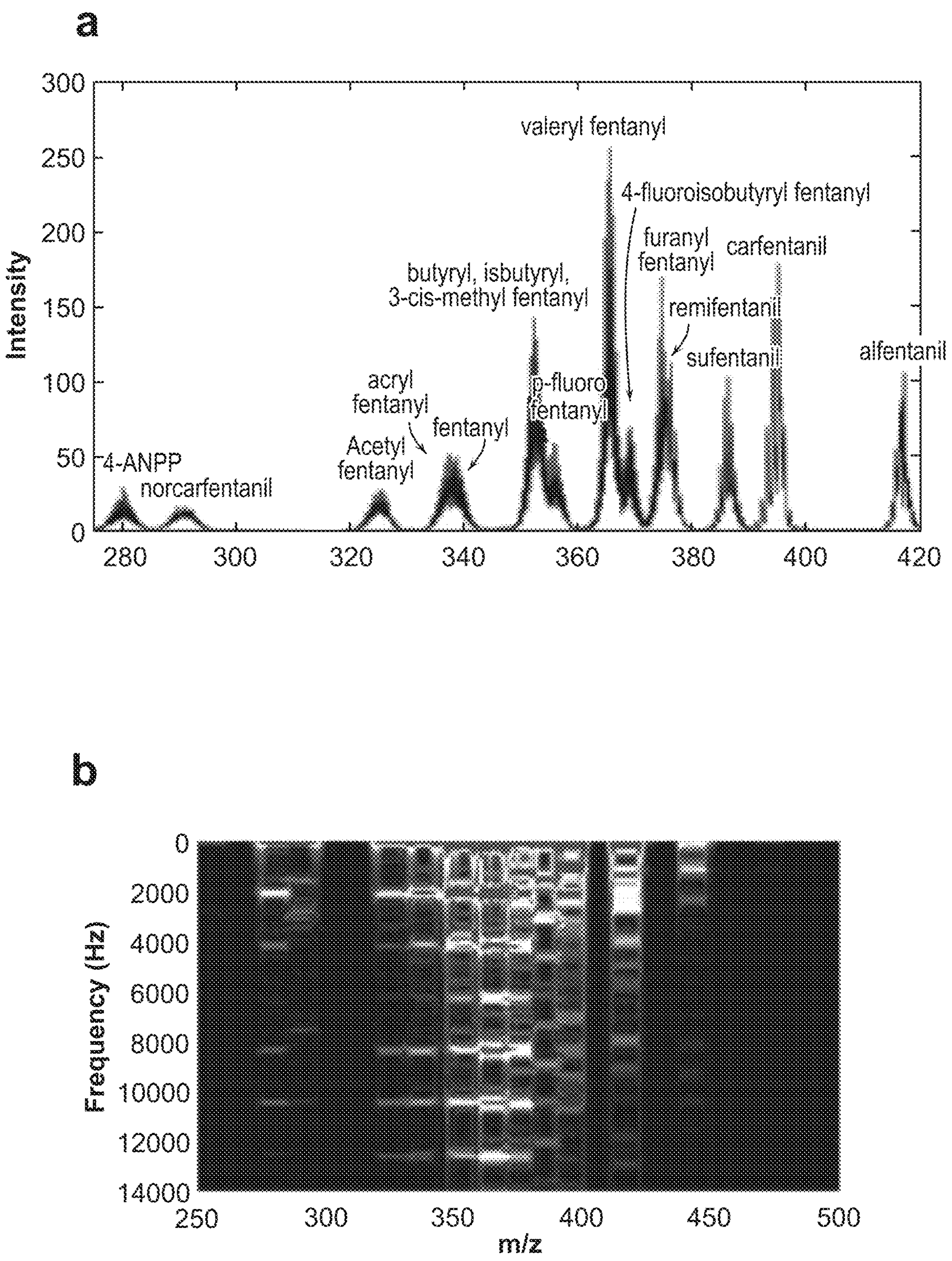
FIG. 12 panels A-C show 2D MS/MS of a mixture of 16 fentanyl analogues using the frequency tagging technique. (Panel A) Full scan mass spectrum of the mixture (note the beats in the spectra), (Panel B) 2D mass spectrum, (Panel C) comparison of frequency spectra of three isobaric fentanyls and three-component mixture. Known product ions are marked in (Panel C).
Figure 12:
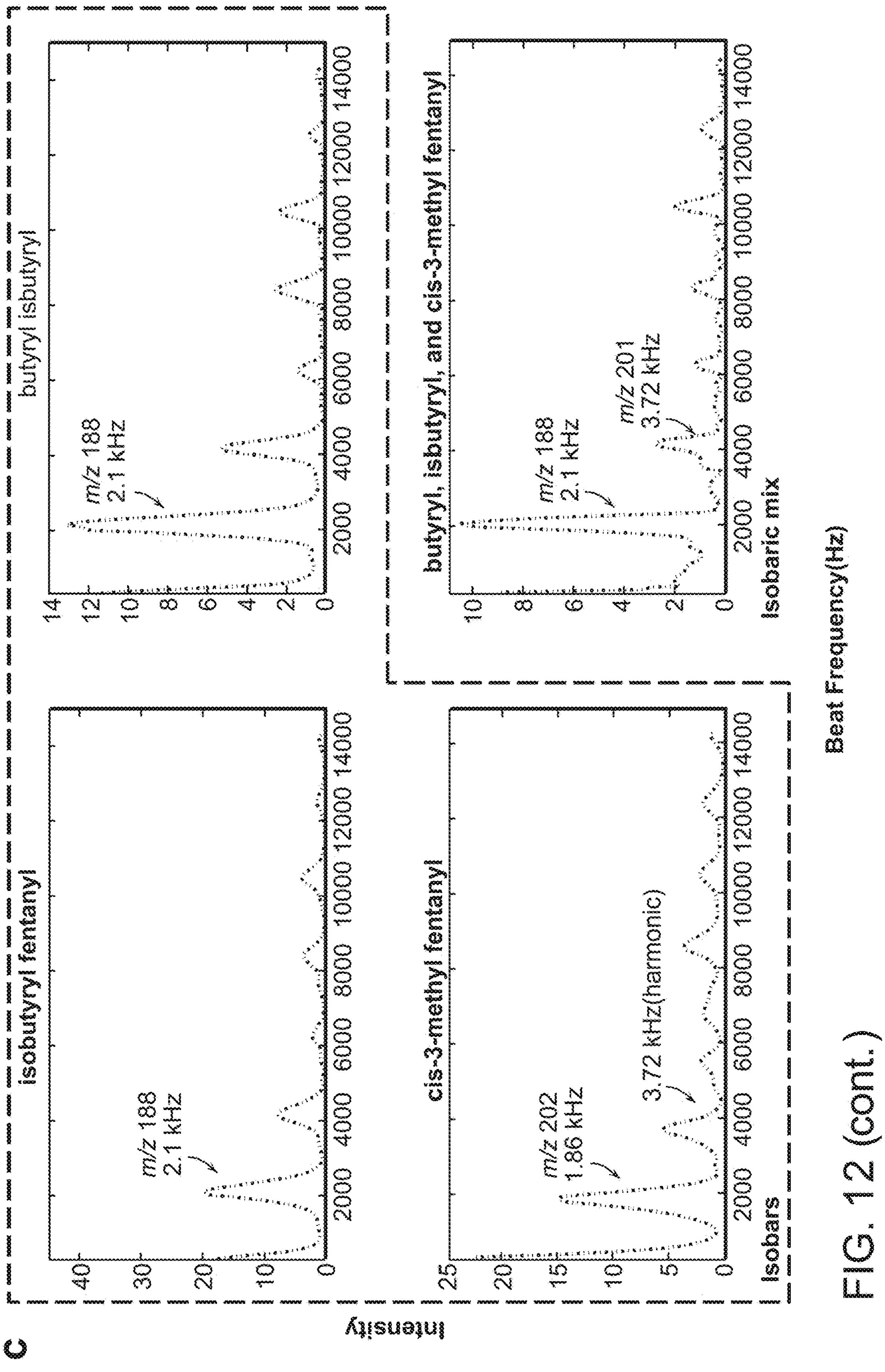

We next applied 2D MS/MS to analysis of opioids of the fentanyl class, which have become a serious health risk due to their extreme potency and wide range of analogues. When subject to CID in the ion trap, many of these compounds fragment almost exclusively to m/z 188 and so their frequency spectra (i.e. product ion spectra) should be markedly similar. A 2D MS/MS scan—as observed at the detectors—of a mixture of 16 fentanyl analogues is shown in FIG. 12 panel A. The precursor ion masses are directly proportional to time, allowing for the spectrum to be mass calibrated. The beats in each peak are indicative of the product ion m/z values and be recovered through FFTs. As shown in FIG. 12 panel B, 4-ANPP (a fentanyl precursor), acetyl fentanyl, 4-fluoroisobutyryl fentanyl, fentanyl, furanyl fentanyl, p-fluorofentanyl, isobutyryl fentanyl, butyryl fentanyl, valeryl fentanyl, and acryl fentanyl all fragment to m/z 188 (2.1 kHz beat frequency) and hence have almost identical frequency spectra, which is evident in the 2D MS/MS spectrum. Cis-3-methylfentanyl, m/z 351, has a prominent product ion at m/z 202 which is noticeably frequency shifted (about 240 Hz) from m/z 188. Acetyl norfentanyl is a metabolite and hence fragments differently as well. Extracted product ion scans for each of these precursors can be found in FIGS. 9 and 13 of the supplemental information, for reference.

Notably, butyryl, isobutyryl, and cis-3-methylfentanyl are isobaric (m/z 351) and so their peaks overlap in the mass spectrum if they are in a mixture together. We tested whether we could observe all three components in a 1:1:1 mixture. The frequency spectrum in the isobaric mix, FIG. 12 panel C (bottom), indicates a primary product ion at m/z 188. Presumably, the peak at m/z 202 overlaps significantly and is not observed. However, the harmonic (1.86 kHz×2=3.72 kHz) is observed because it is twice as far from the harmonic of m/z 188 compared to the fundamental frequencies, and thus it is umambiguous that methylated fentanyl is in the spectrum. Butyryl and isobutyryl fentanyl are nearly indistinguishable, though, since they almost exclusively fragment to m/z 188.

Figure 13:
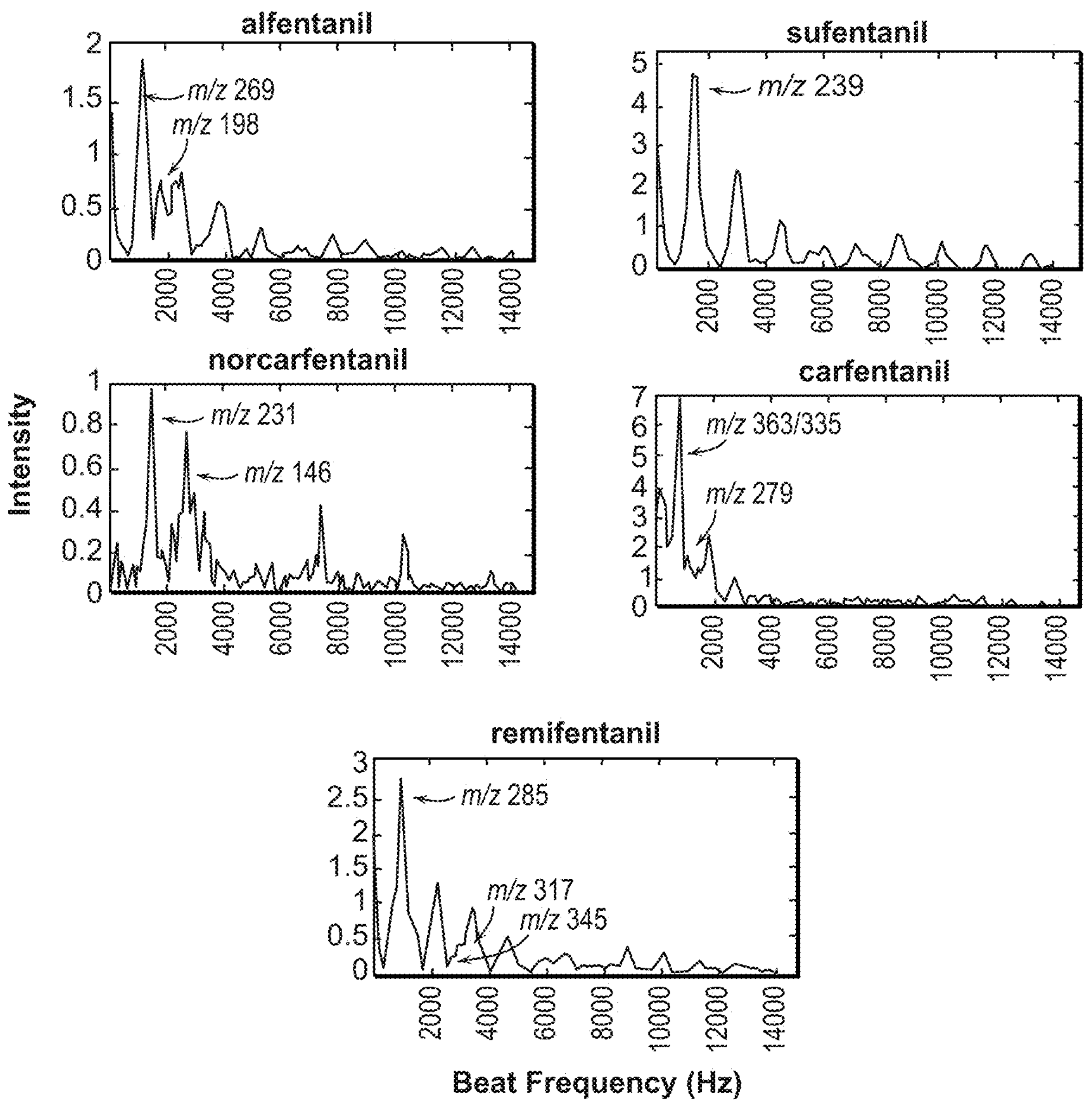
FIG. 13 shows frequency tagging spectra of five fentanils using frequency tagging.

Quaternary fentanils (emphasis on the 'il') share neutral fragments—e.g. 31 Da, 32 Da, 60 Da, 148 Da are examples—instead of product ions. In the frequency domain the similarities are not obvious, which is a weakness of the current method. The frequency domain must be converted to the mass-to-charge domain and then to neutral losses to make any reasonable conclusions about similarities between spectra. FIG. 13 shows the frequency spectra of alfentanil and sufentanil (which share neutral losses of 31 Da and 148/149 Da) and norcarfentanil, carfentanil, remifentanil (which share neutral losses of 32 Da, 60 Da, and 149 Da).

2D MS/MS for Analysis of Other Molecular Classes

Figure 14:
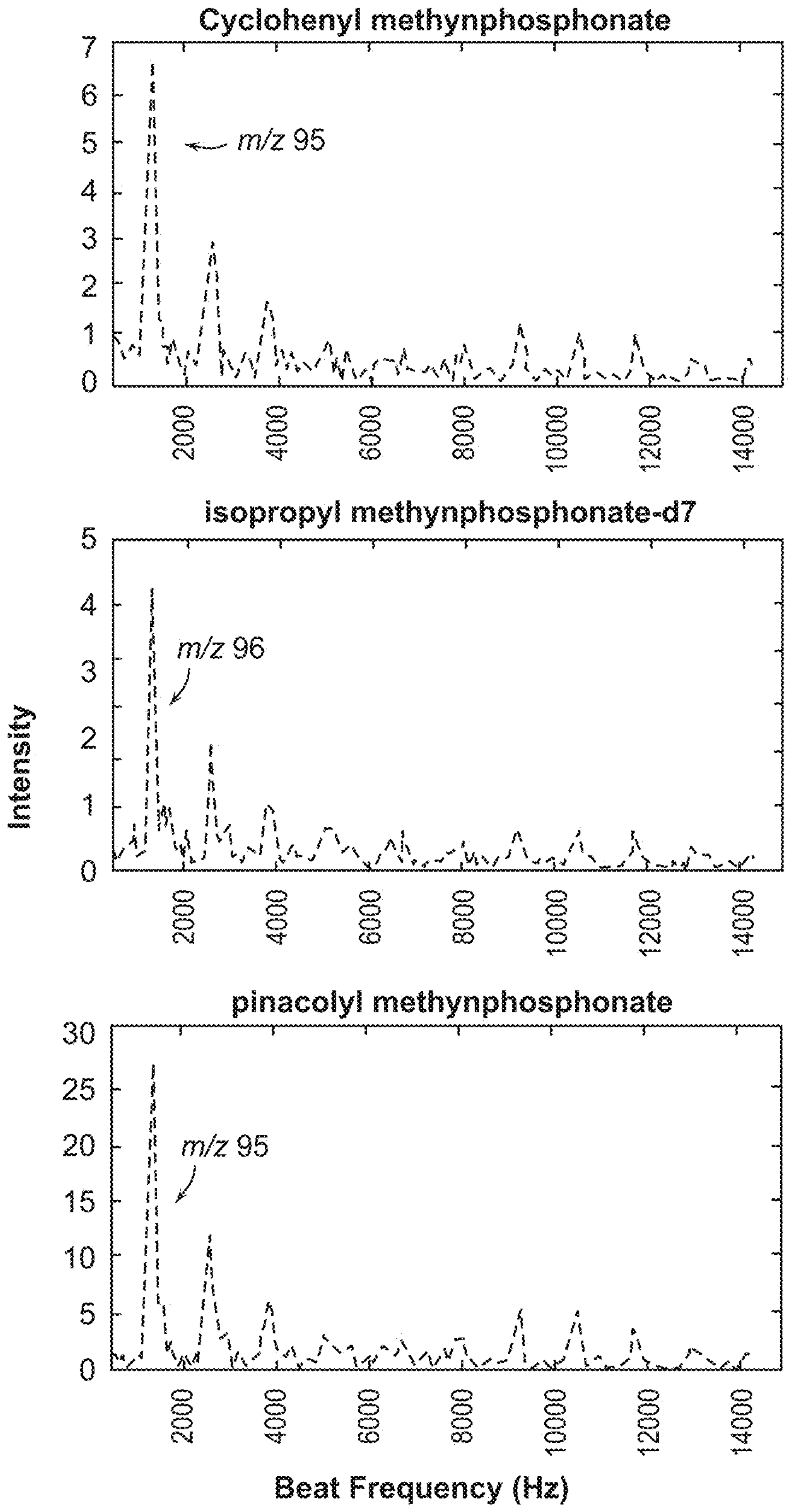
FIG. 14 shows frequency tagging spectra for (top, green) three chemical warfare agent simulants, (middle, dark blue) three tetracyclic antidepressants, and (bottom, red) four antihistamines. The chemical warfare agent spectra were obtained at a LMCO of 65 Th; other data was obtained in 'high mass' mode (LMCO 100 Th).
Figure 14:
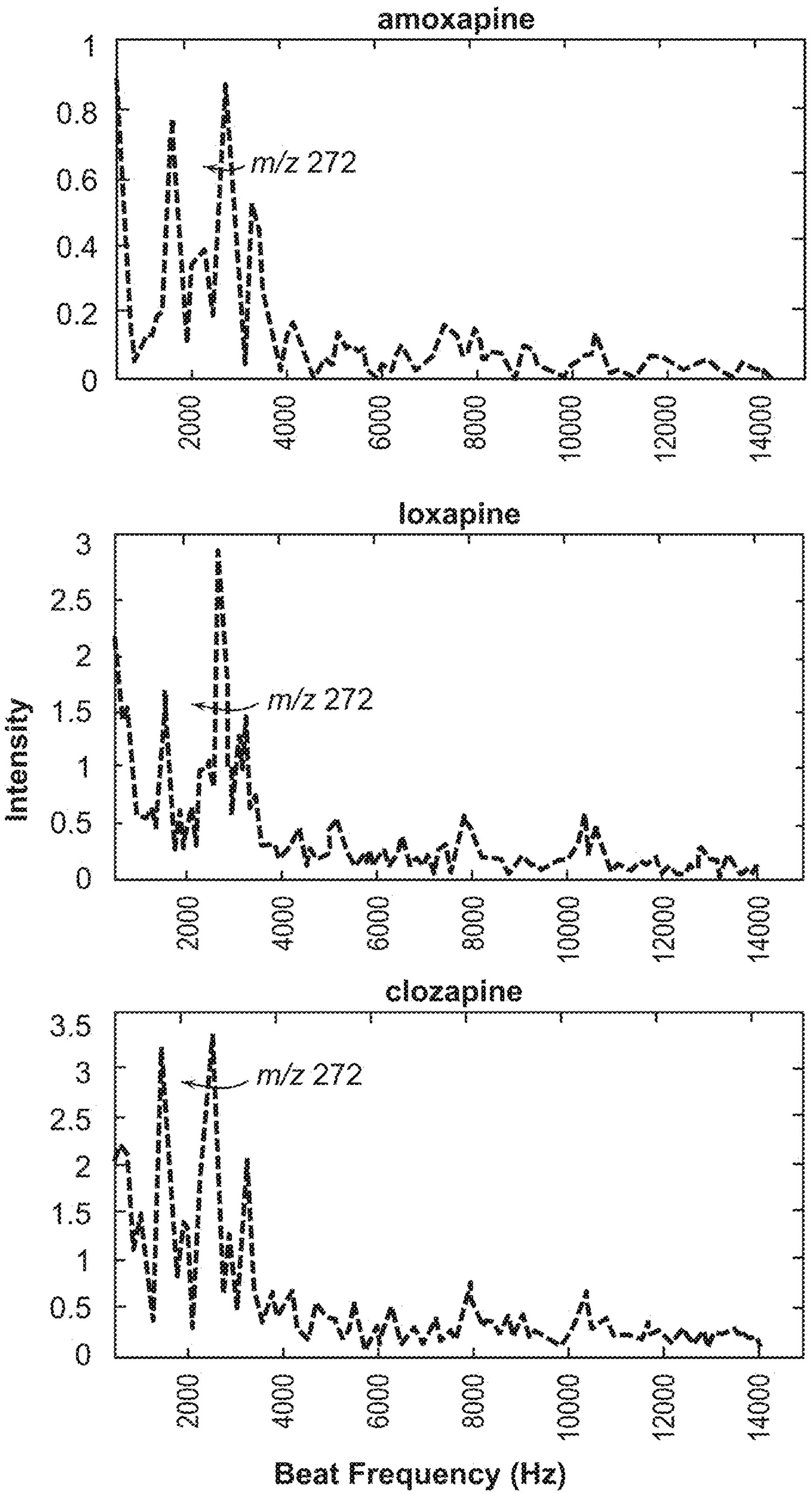
Figure 14:
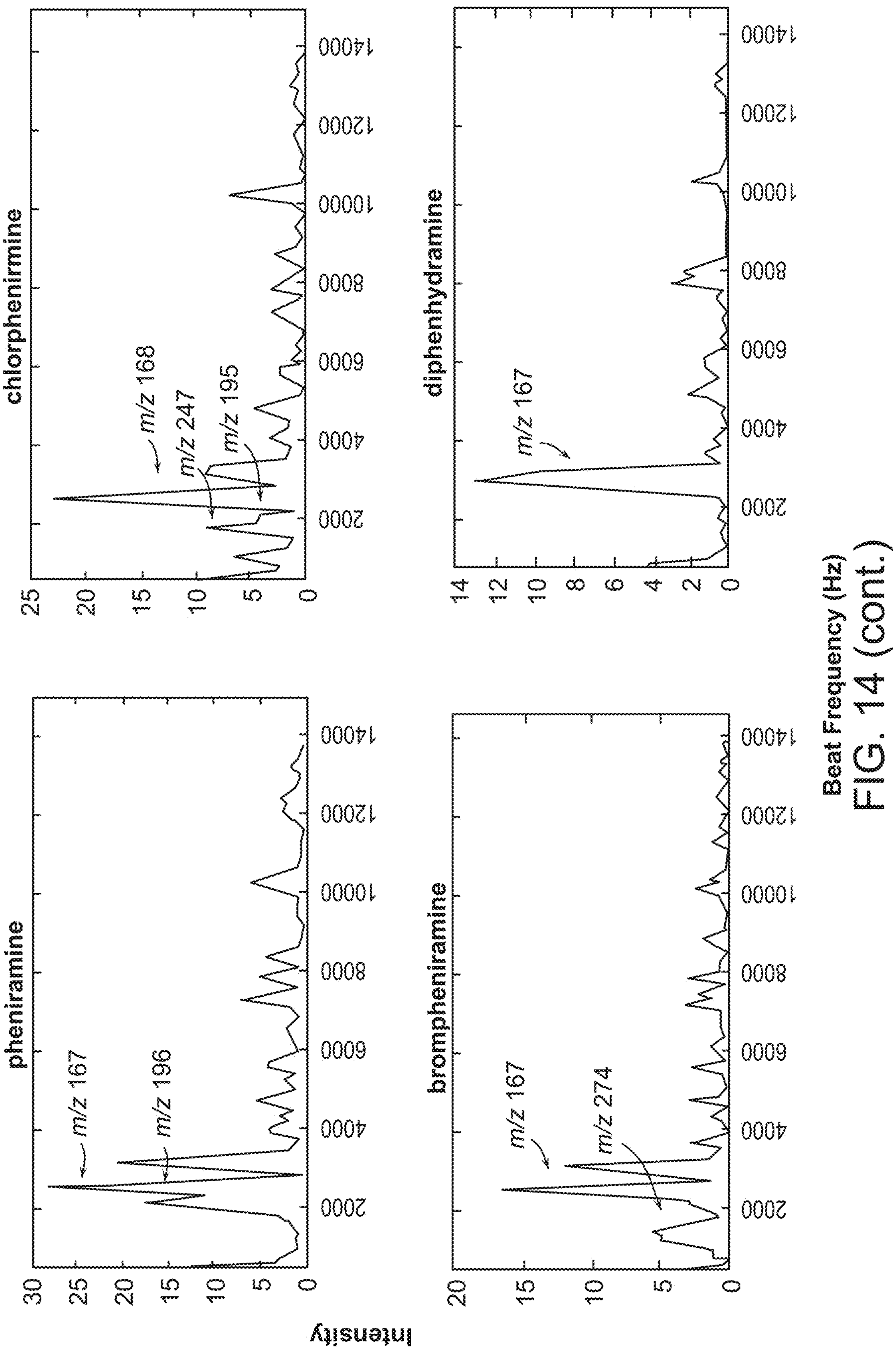
Figure 15:
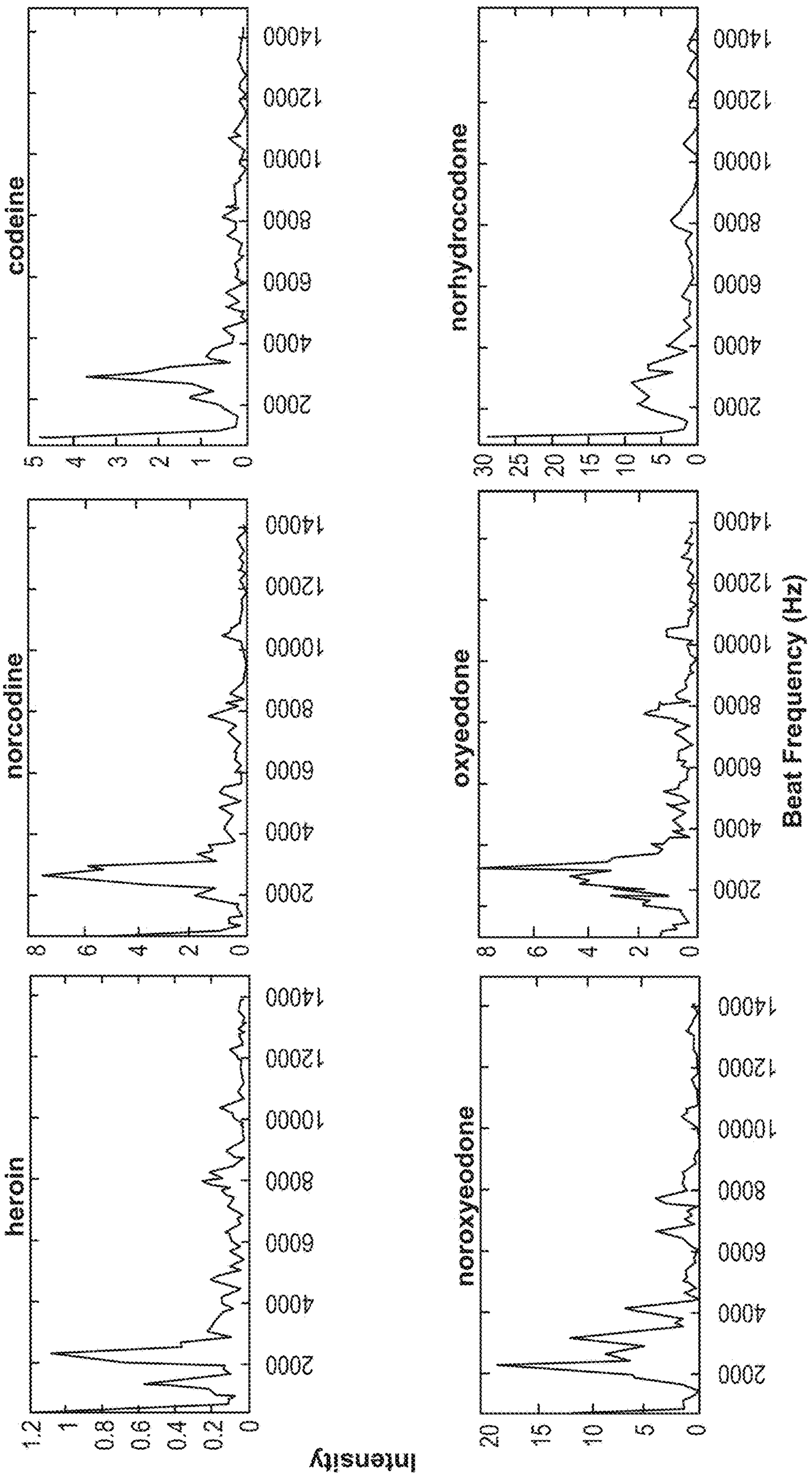
FIG. 15 shows frequency tagging spectra of opioid standards and metabolites as well as caffeine. All data was acquired in 'high mass' mode.
Figure 15:
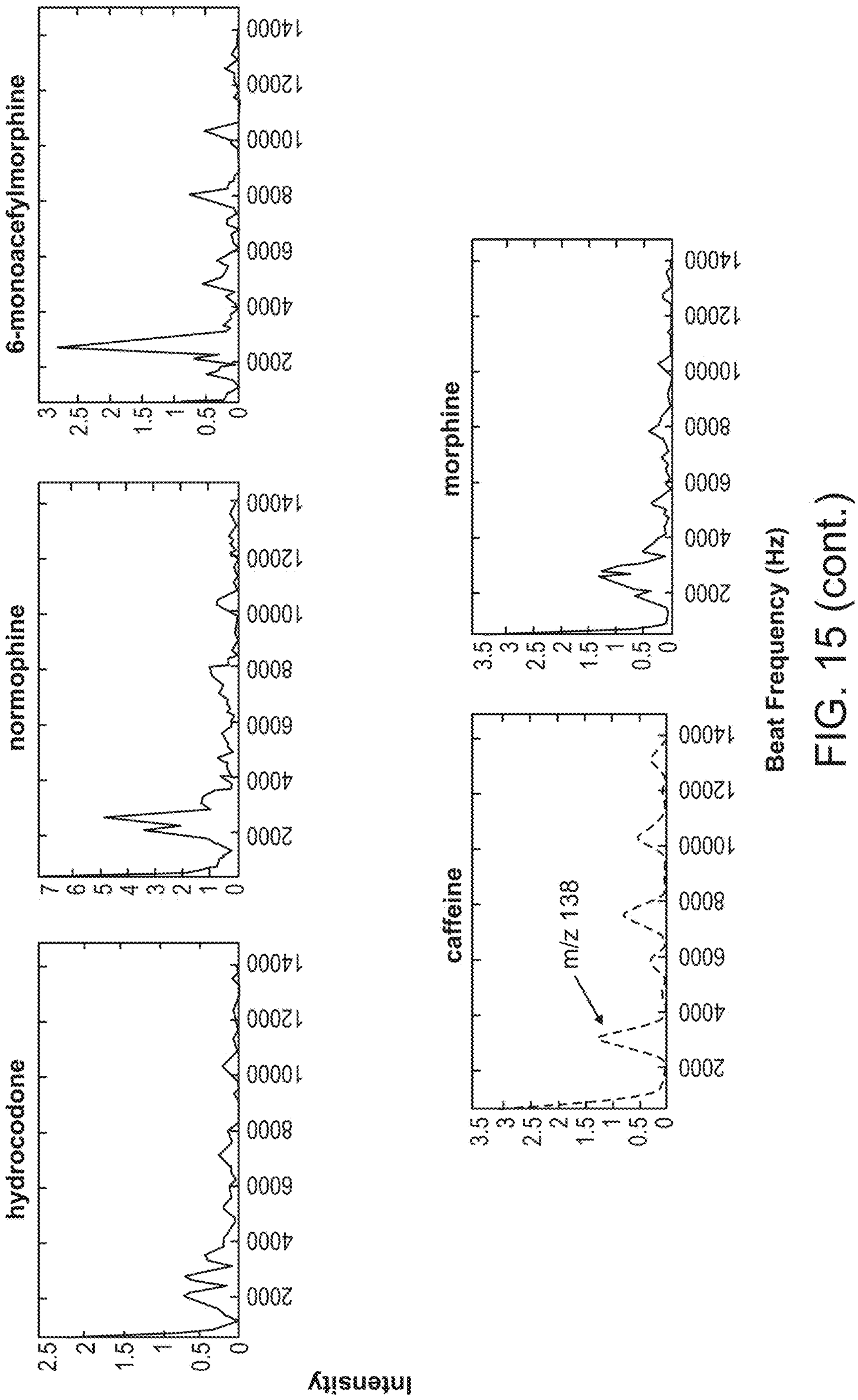
Figure 16:
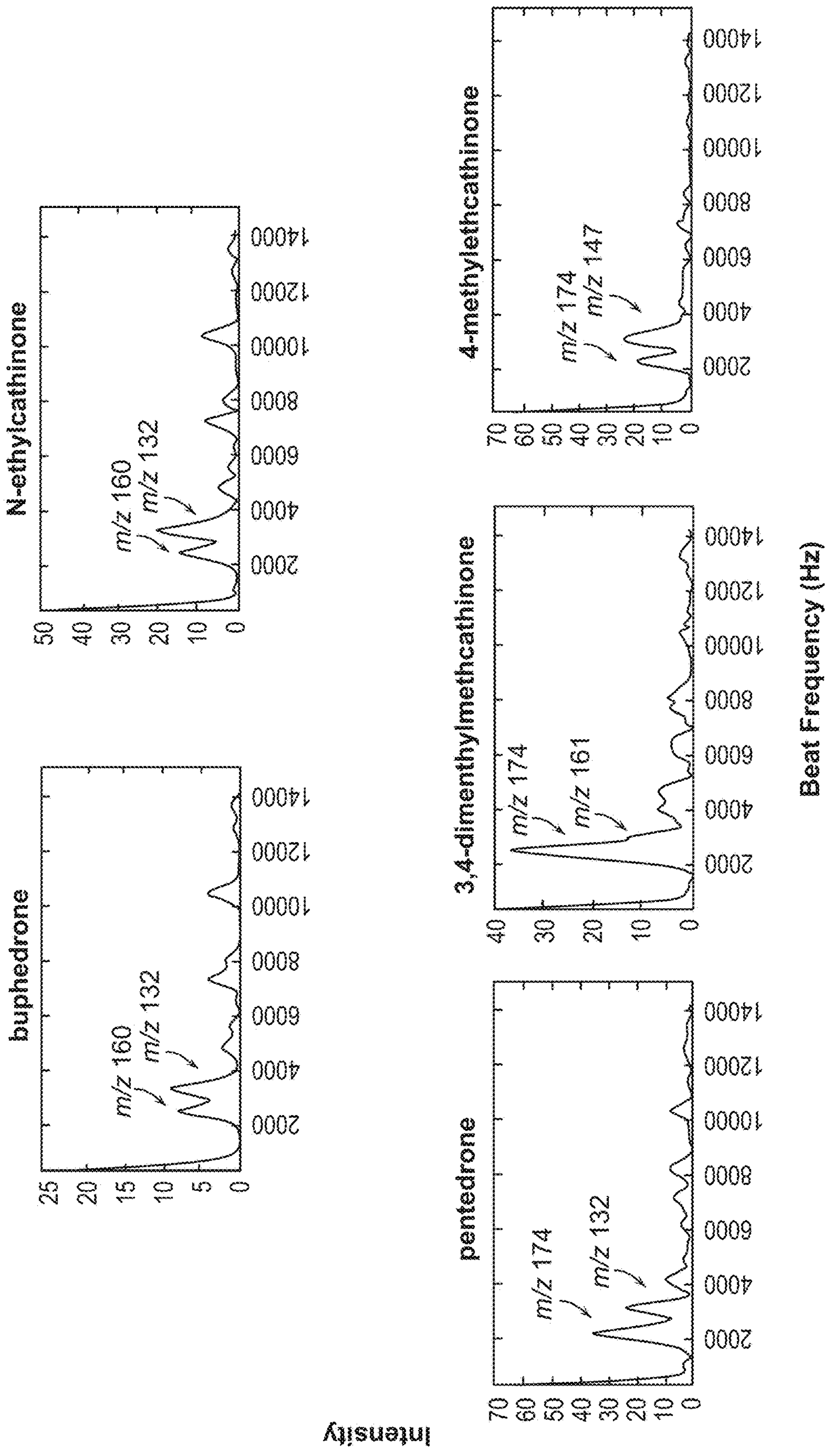
FIG. 16 shows frequency spectra (product ion MS/MS) of sets of cathinone isobars: m/z 178 isobars buphedrone and N-ethylcathinone; m/z 192 isobars pentedrone, (d) 3,4-dimethylcathinone, and 4-methylethcathinone. Data was acquired in 'high mass' mode.

Frequency tagging spectra of other molecular classes—focusing on classes that share product ions rather than neutral losses—are shown in FIGS. 14-16. Chemical warfare agent simulants cyclohexyl methylphosphonate, isopropyl methylphosphonate-d7, and pinacolyl methylphosphonate fragment exclusively to m/z 95 (m/z 96 for the deuterated analyte) in the negative ion mode and thus have very similar frequency spectra, including strong harmonics. Tetracyclic antidepressants amoxapine, loxapine, and clozapine share m/z 272 but otherwise have dissimilar spectra in both the mass and frequency domain. Antihistamines pheniramine, chlorpheniramine, brompheniramine, and diphenhydramine share m/z 167 (or m/z 168), as noted on the spectra, but also have other dissimilar product ions. Other opioids (along with caffeine as a reference spectrum) were analyzed, with results in FIG. 15.

Analysis of Isobaric Cathinones

Figure 17:
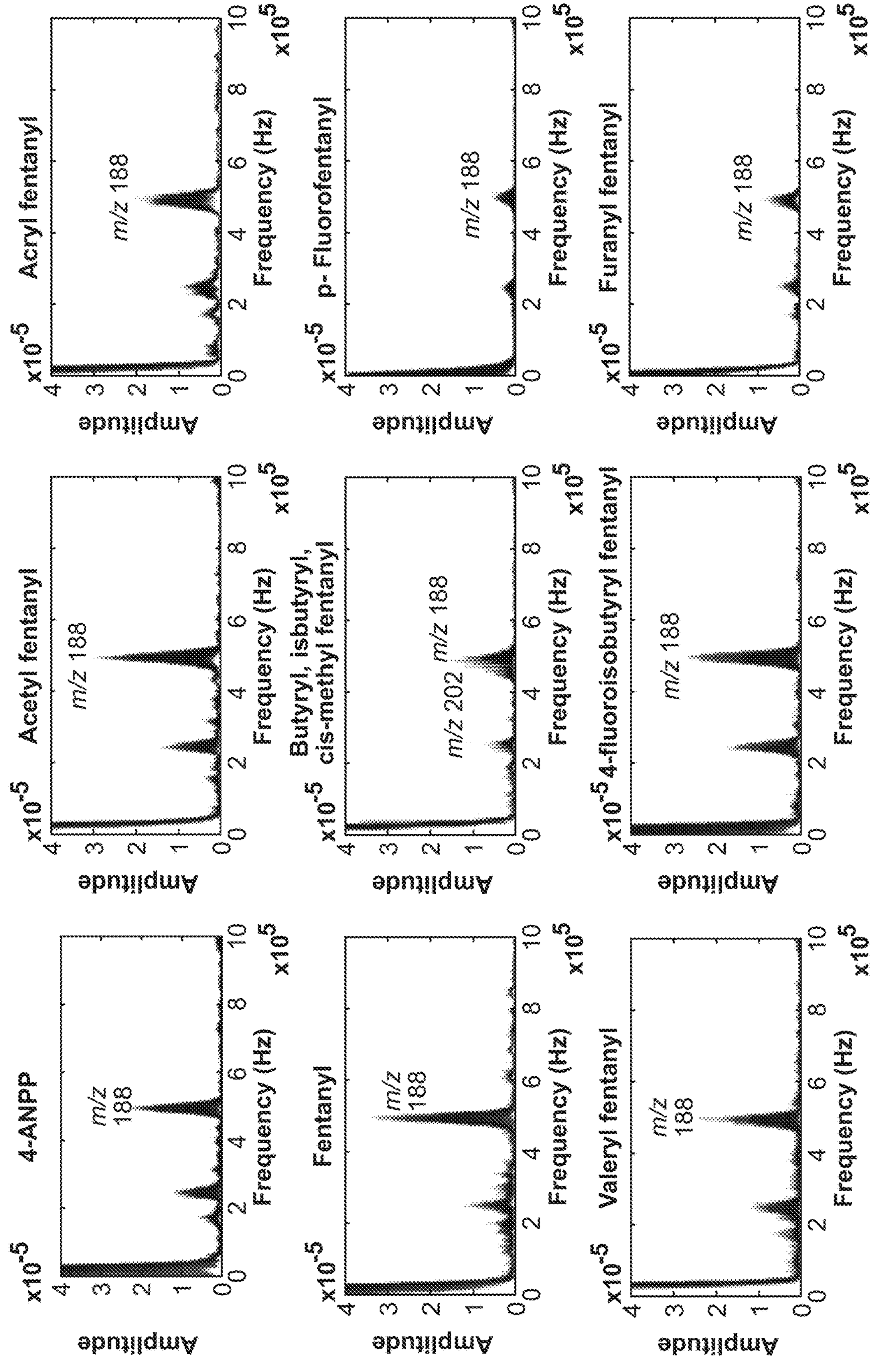
FIG. 17 shows product ion spectra (in the frequency domain) of various fentanyls using the micropacket method.

A challenge in mass spectrometry is differentiating isobars, particularly if those isobars fragment similarly. Not only will their product ion spectra appear similar, but so will their 2D MS/MS frequency spectra. As shown in FIG. 17, isobaric cathinones buphedrone and N-ethylcathinone (m/z 178) share product ions at m/z 160 and 132 and are nearly indistinguishable. However, three other cathinone isobars, namely pentedrone, 3,4-dimethylmethcathinone, and 4-methylethcathinone (m/z 192) are—remarkably—readily distinguished. Although they share water loss (m/z 174), they also have unique $MS^2$ ions m/z 132, m/z 161, and m/z 147. As we showed previously, mixtures of isobars can also be identified if standard spectra of the individual components are known.

Because the measured frequencies using frequency tagging are <10 kHz and are only measured for a few ms, the frequency resolution and hence mass resolution are limited. Next, we describe an alternate approach to obtaining 2D MS/MS spectra through double resonance excitation combined with observation of micropacket frequencies which are on the order of 50-500 kHz. This approach measures higher frequencies and therefore achieves higher frequency and mass resolution for the product ions. Moreover, there is less spectral overlap from harmonics and combination frequencies.

What is an Ion Micropacket?

Ions can only be ejected during certain 'allowed' periods in a quadrupole ion trap operated in the resonance ejection mode. This has been observed through both simulation and experiment by several groups using a variety of ion trap configurations. As ions are resonantly excited for ejection through application of an auxiliary frequency, they oscillate coherently and are ejected such that the rate of appearance of the micropackets at the detector corresponds to the excitation frequency (not the ion secular frequency). If a detector is placed on either side of the ion trap, then the micropackets are observed at a frequency corresponding to twice the auxiliary frequency since the ions are ejected twice per secular frequency cycle. The frequency of ejection can be determined through Fourier transform of each mass spectral peak, assuming the detection electronics are fast and sensitive enough to observe the micropackets. In the experiments performed here, the LTQ electrometer board could not observe the micropackets, so we bypassed it and used a custom current amplifier and DAQ system operated at a 2 MHz sampling rate.

2D MS/MS Using Ion Micropackets

Ion micropackets can be used for two-dimensional mass spectrometry scans in a quadrupole ion trap. Experimentally, this 2D MS/MS scan is identical to the frequency tagging 2D MS/MS scan in that precursor ions are excited in the y dimension using an ac frequency sweep (with constant rf voltage) while the product ions are ejected toward the detectors in the x dimension through application of a broadband auxiliary waveform. For these micropacket experiments, the frequency spacing of the waveform was a constant 1 kHz from start frequency 62 kHz to end frequency 583 kHz, but only frequencies at least 10 kHz above the y dimension excitation frequency were included in the corresponding broadband waveform at each time point.

Figure 18:
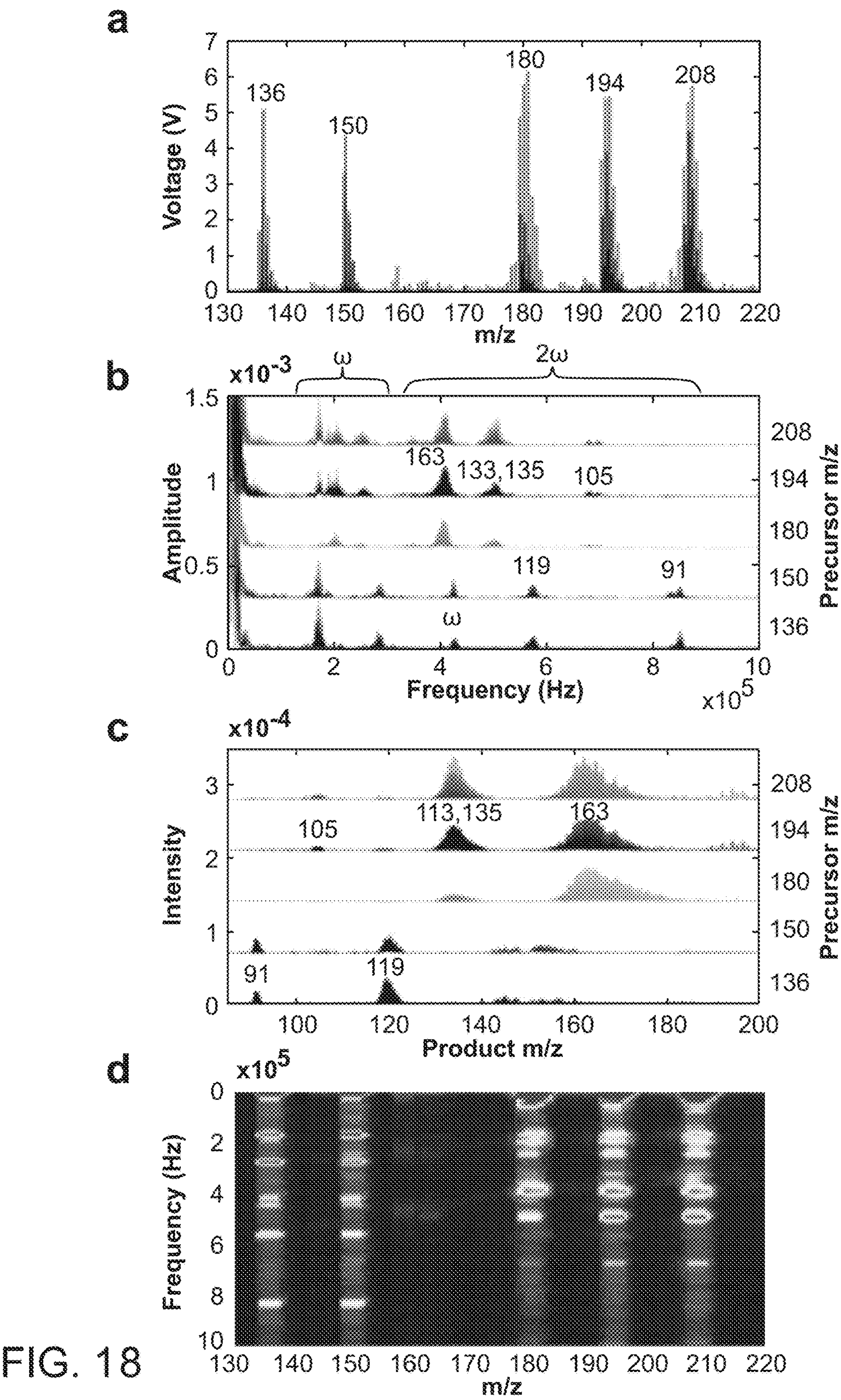
FIG. 18 panel A shows 2D MS/MS spectrum of five amphetamines using the micropacket technique as observed at the detectors (precursor m/z values are labelled).

FIG. 18 panel A shows the two-dimensional mass spectrum of the same set of five amphetamines as observed at the detector. As before, precursor ion m/z and time are directly proportional. Note the beats in the peaks which are caused by the broadband waveform frequency spacing and distribution of phases. The ion micropackets are also present within these patterns and can be determined via Fourier transform of the individual peaks (FIG. 18 panel B). Peaks widths of 5-10 ms containing 10,000-20,000 points were used for the FFTs. Amphetamine and methamphetamine fragment to m/z 91 and m/z 119, and these peaks are noted. The shared product ions of mda, mdma, and mdea are also labeled. All labeled peaks are frequency doubled (second harmonic of the secular frequency) since these have higher intensity than the primary frequency and also give better resolution because they are higher frequencies. We can calibrate the secular frequency to m/z conversion through Mathieu parameters using the known product ion m/z values and the center of the product ion frequency profiles in panel (b). Based on these data, mass calibrated product ion spectra in FIG. 18 panel C were generated. Clearly the resolution at low m/z (high Mathieu q) is best (approaching unit for m/z 91), which is expected and discussed later. The full 2D MS/MS data domain was calculated as described for the frequency tagging technique and is shown in FIG. 18 panel C. Note the remarkable similarities not only between spectra containing similar product ions (e.g. mda, mdma, and mdea), but also between the frequency tagging technique (FIG. 11) and this micropacket technique (FIG. 18 panels A-D).

Figure 19:
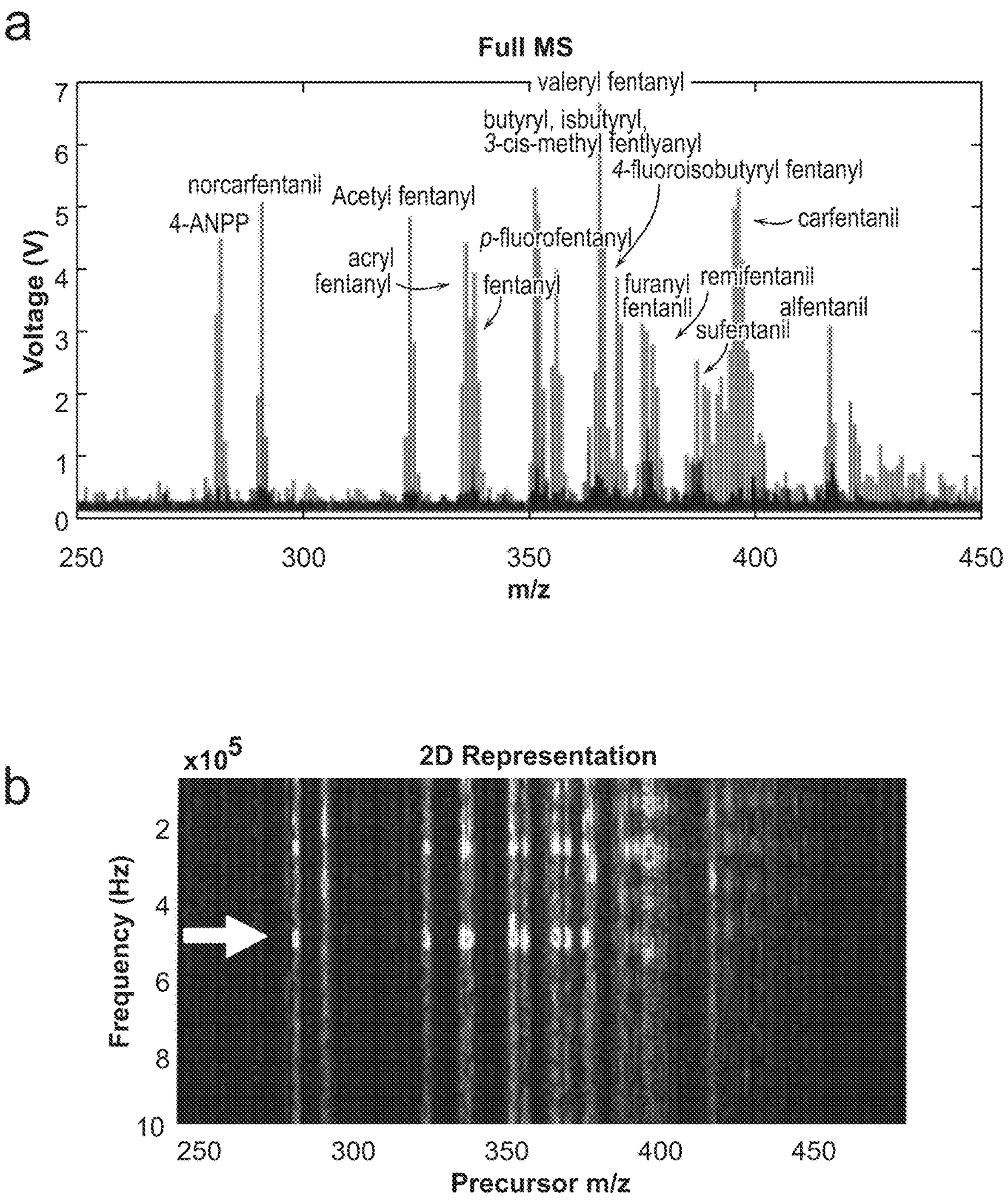
FIG. 19 panels A-C show 2D MS/MS spectrum of fentanyl analogues using the micropacket technique. (Panel A) mass calibrated spectrum of sixteen fentanyl analogues as observed at the detector, (Panel B) image representing the 2D MS/MS domain reconstructed from (Panel A), and (Panel C) frequency spectra (i.e. product ion spectra) of selected peaks. Known product ion m/z values are marked in (Panel C). The white arrow in (Panel B) corresponds to the second harmonic of m/z 188's ejection frequency.
Figure 19:
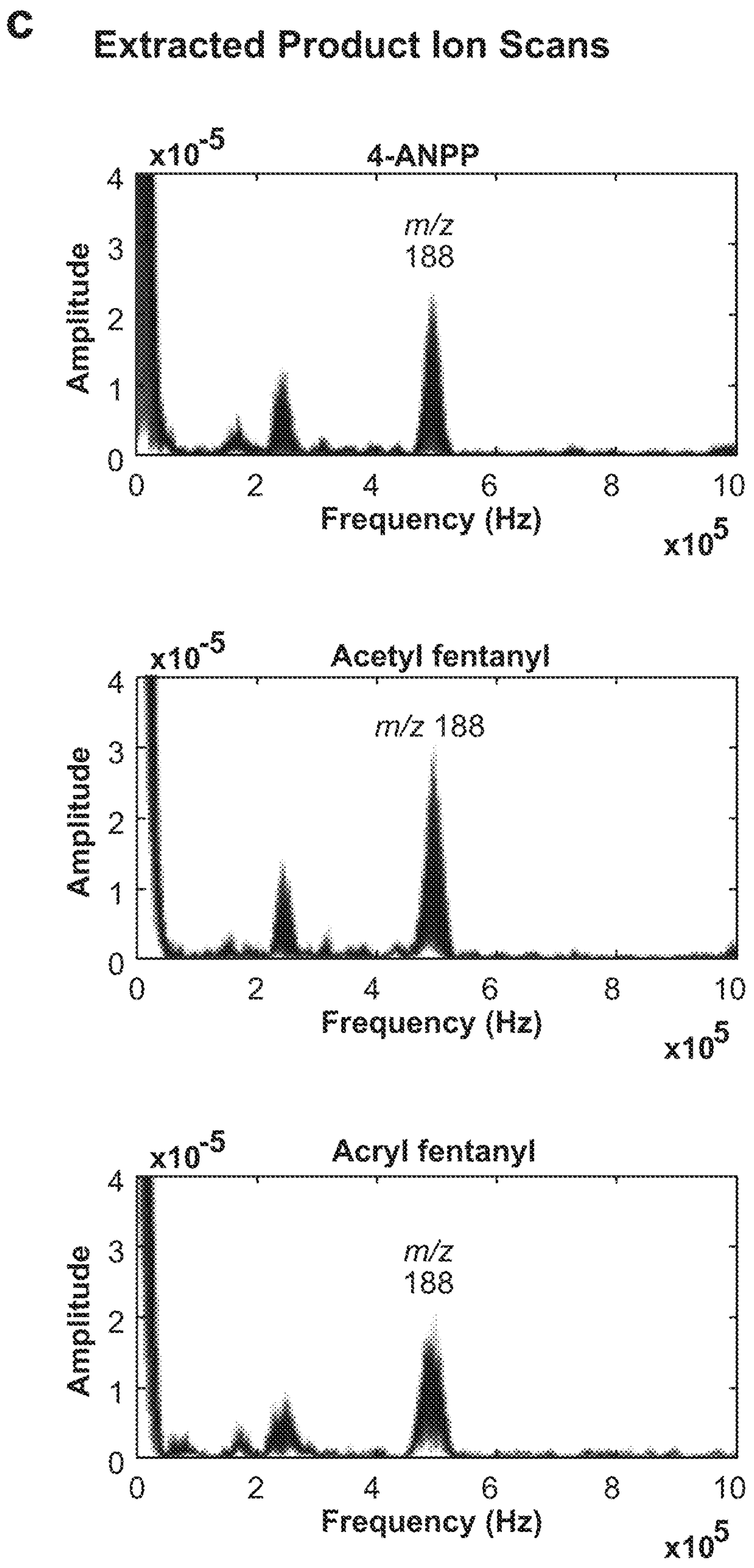
Figure 20:
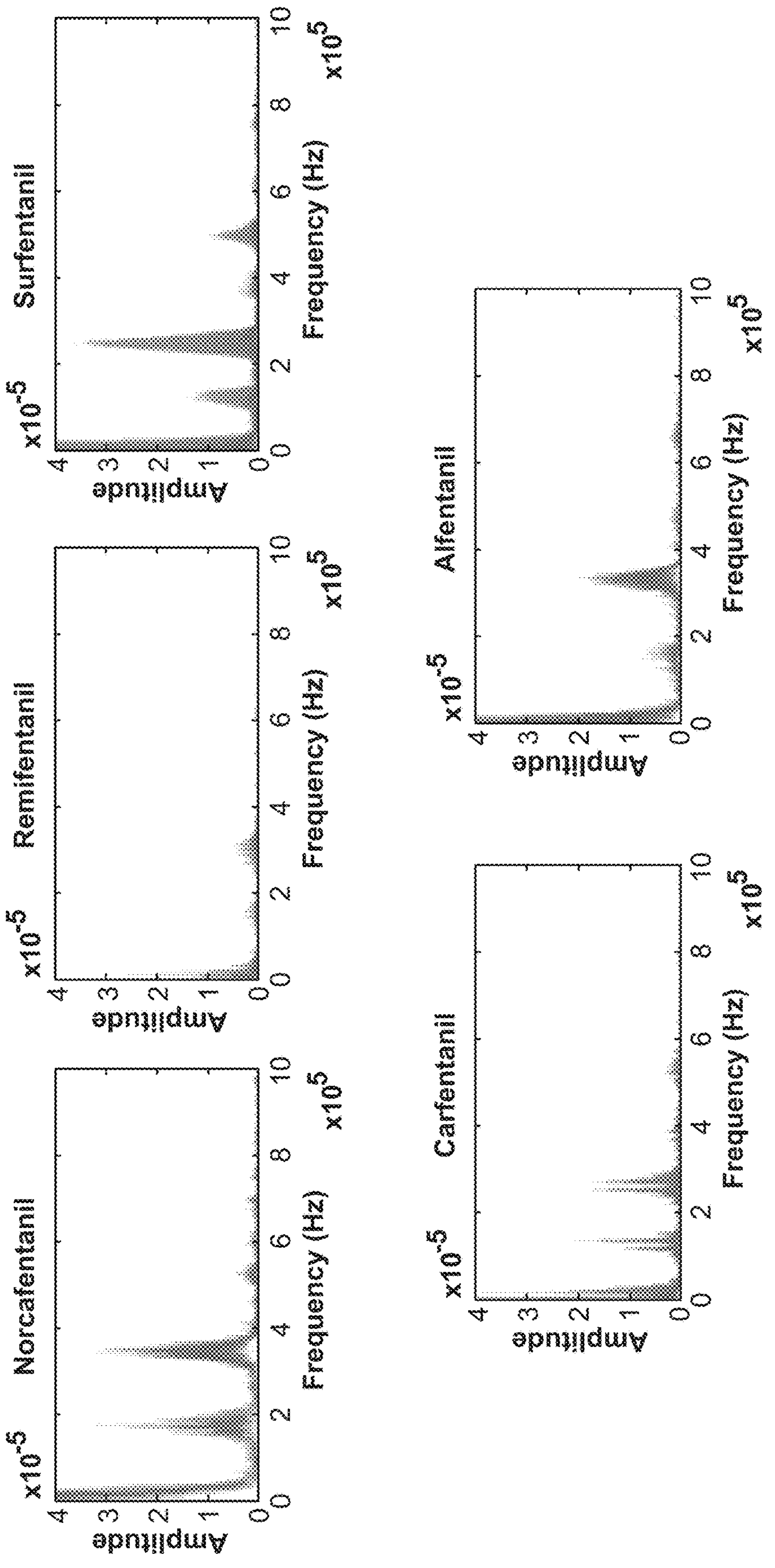
FIG. 20 shows product ion spectra (in the frequency domain) of various fentanils using the micropacket method.

FIG. 19 panel A is a 2D MS/MS spectrum of a set of 16 fentanyl analogues and metabolites as observed at the detector, and the 2D data domain is illustrated as an image in FIG. 19 panel B. The similarities between many of the analytes are notable, with m/z 188—the second harmonic of which is indicated by the white arrow in panel (B)—being the primary fragment. Selected product ion spectra are shown in panel (C) and indicate the structural similarities between 4-ANPP (a fentanyl precursor), acetyl fentanyl, and acryl fentanyl. Product ion spectra in the frequency domain for all the other fentanyl analogues are shown in FIGS. 17 and 20 for reference.

Application to Planetary Exploration

So far, only forensic applications have been demonstrated. However, planetary science is perhaps a more appropriate application of 2D MS/MS. A central objective of NASA's Planetary Sciences Division is to explore prebiotic chemistry on other worlds, that is, to elucidate possible chemical origins of life and determine if other habitable bodies do contain (or have contained) prebiotic molecules and the means to assemble those organics into more complex species. Within this framework, worlds containing (or suspected to contain) subsurface lakes—notably Mars and the icy moons of Saturn and Jupiter—are the most promising candidates for exploration and study. Mass spectrometry has played a critical role in several corresponding missions (Mars Curiosity—a quadrupole mass spectrometer; Cassini-Huygens—time-of-flight and quadrupole mass spectrometers; ExoMars Mars Organic Molecule Analyzer, planned launch in 2020—linear ion trap), with quadrupole ion trap technologies recently taking center stage because of their high sensitivity, MS/MS capabilities, and ease of miniaturization.

A key difference between the Mars missions and those targeting Enceladus, Titan, and Europa is in the sampling methodology. Whereas Curiosity and ExoMars are rovers which drill into the Martian surface for sampling and use laser desorption/ionization or thermal desorption electron impact ionization to produce gas-phase ions for mass spectrometric analysis, the icy moon missions are notably different. For example, Cassini-Huygens was a flyby mission wherein high-velocity (relative to the spacecraft) ice grains were collected and fragmented via impact with the spacecraft's rhodium sample collector and analyzed with a time-of-flight mass spectrometer. Other small molecular ions or their impact fragments were analyzed by a quadrupole mass spectrometer. Unfortunately, because MS/MS capabilities were not implemented, no structural information could be garnered from this data, only molecular weight information. Moreover, in these missions sampling opportunities and sample availability are extraordinarily limited, even more so than rover missions. For this reason, it is imperative that the mass spectrometer collect as much m/z information as possible in the least possible number of scans. This can be accomplished through 2D MS/MS.

Figure 21:
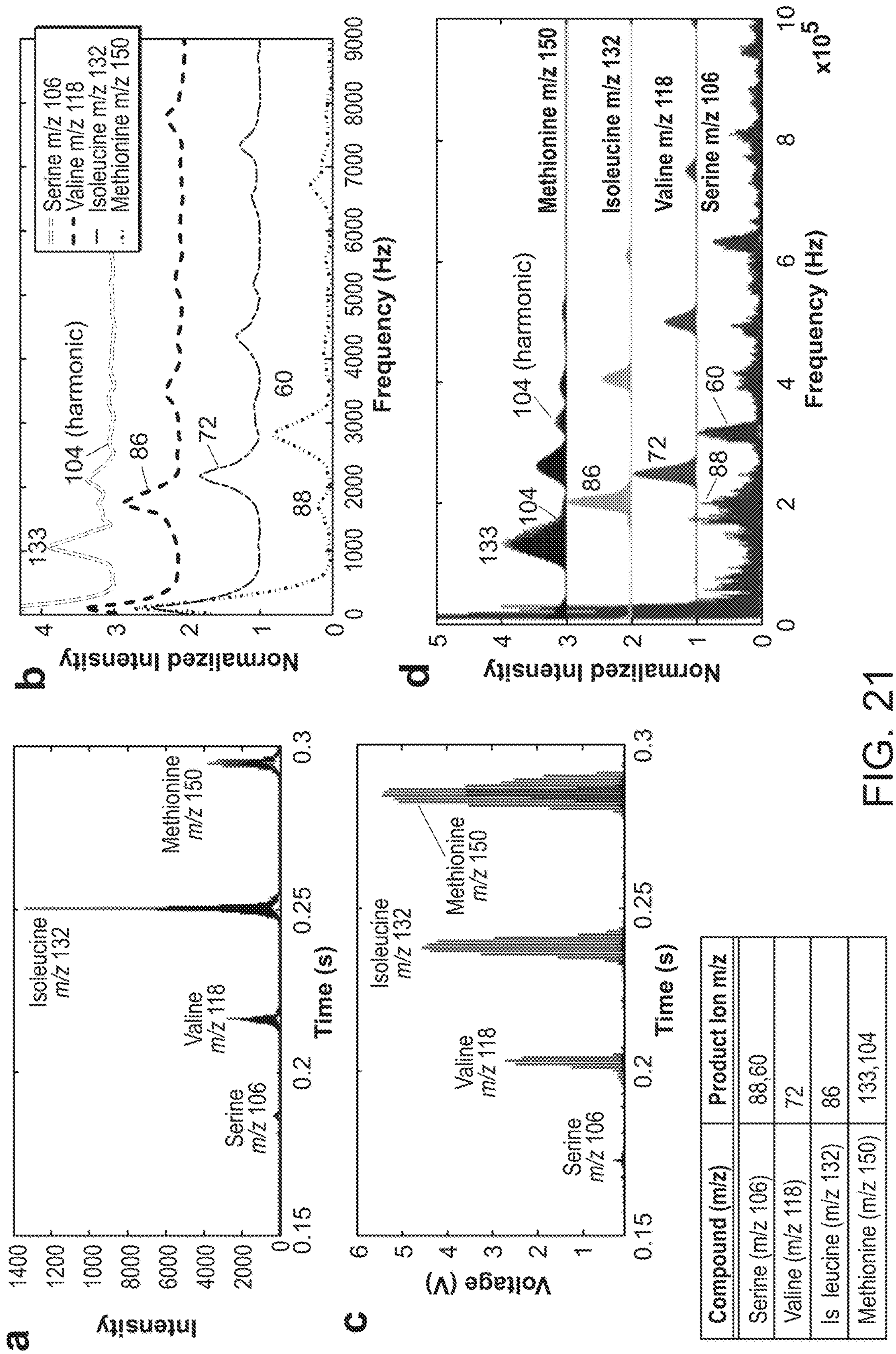
FIG. 21 panels A-D show two-dimensional mass spectrometry of four amino acids on an LTQ linear ion trap.

FIG. 21 panels A and C show the 2D MS/MS spectrum of four amino acids, serine, valine, isoleucine, and methionine, using the frequency tagging technique and the micropacket technique, respectively. Known product ions from conventional product ion scanning are noted in the table in FIG. 21 panels A-D and are evident in the (FIG. 21 panel B) frequency tagging product ion spectra as well as the (FIG. 21 panel D) micropacket product ion spectra. Again, it is remarkable that two different encoding schemes returned almost identical product ion spectra.

Improved Product Ion Resolution

One of the primary motivations for measuring the ejection frequency of the product ions at the detector is to improve the resolution of the 'frequency tagging' 2D MS/MS method. In 'frequency tagging' low kHz beat frequencies were observed in the mass spectral peaks at the detector, with mass resolutions (m/Δm) of 15 and 13 for m/z 91 and m/z 119 of amphetamine and 10 for m/z 163 of MDMA (FIG. 22). For m/z 91 and m/z 119 of amphetamine, much improved mass resolutions of 120 and 48 were obtained for the micropacket method, and for MDMA the resolution of m/z 163 was increased to 20.6. We do note that these resolution values are fundamentally limited by ion secular frequency bandwidths and off-resonance excitation effects. Moreover, the product ions are distributed over Mathieu q space when they are formed and ejected so that higher mass resolution will always be obtained for the lower m/z product ions which have greater frequency dispersions in the ion trap than higher m/z ions. Even so, it may be possible to improve the frequency resolution further by improving the phasing of the broadband ejection waveform or by optimizing the amplitude of the waveform. A second advantage of the micropacket method over the frequency tagging method is that less harmonic overlap is observed in the frequency spectra since higher frequencies are measured.

Conclusion

We have demonstrated a method of performing two-dimensional mass spectrometry in a linear quadrupole ion trap using orthogonal double resonance excitation. One method utilizes beat frequencies to modulate mass spectral peaks while the other utilizes the frequency information contained in the product ion micropackets to obtain product ion spectra. The method should be especially promising for ion traps with low acquisition rates or for cases where sample or instrument power is precious, as a single scan can be used to obtain a remarkable amount of information. These scans can then be followed by targeted data-dependent product ion scans to improve the resolution of the product ion spectra.

Example 3: Program for Building a Frequency Tagged Broadband Waveform for Use Alongside an Inverse Mathieu q Scan

```
% Program for building a frequency tagged broadband waveform for use with the %
corresponding inverse Mathieu q scan
% Define variables
scan_time = .6;                          % scan time in seconds
begin_q = 0.908;                         % Starting Mathieu q value of the inverse q scan
end_q = 0.15;                            % Ending Mathieu q value of the inverse q scan
sampling_rate = 5000000;                 % sampling rate of wavefor
rf_frequency = 1166000;                  % tuned rf frequency in Hz
num_points = ceil(sampling_rate * scan_time); % number of points in waveform
time = linspace(0, num_points-1, num_points)*scan_time/num_points;
                                         % time variable
frequency_resolution = 10000;            % spacing between main frequencies (Hz)
first_beat_freq_Hz = 500;                % smallest beat frequency
```

-continued

```
beat_freq_spacing_Hz = 100;                      % spacing between beat frequencies
distance_from_lower_bound = 10000;                 % space between lower frequency bound and
                                               % lowest frequency in broadband signal
                                               % (Hz)
phase_fudge_factor = 0.0001;                      % used for phase overmodulation to keep
                                             % amplitude of waveform
                                             % approximately constant
% Calculate Mathieu q values as a function of time
% assume sweep according to q = k / (t−j)
% The array 'q_values' tells us which precursor ion is being fragmented at
% any given time. We need to know this because the product ions of this
% precursor ion will always have frequencies higher than the precursor,
% assuming the ions are singly charged.
j = end_q*scan_time / (end_q − begin_q);
k = −begin_q*j;
q_values = k ./ (time − j);
% Calculate the frequency lower bound (i.e. the frequency of the excited
% precursor ions) as a function of time from Mathieu q
% values and rf frequency.
% We need the frequencies in the broadband waveform to always be above the
% lower bound because the product ion mass range - and thus frequency range -
% varies as a function of time (because the precursor ions are fragmented
% from low to high m/z) and thus the frequencies in the broadband
% waveform must also vary with time.
lower_bound_frequencies = zeros(num_points,1);
betas = zeros(num_points,1);
for i = 1:num_points
  betas(i) = beta_calculator(q_values(i));
  lower_bound_frequencies(i) = betas(i)*rf_frequency/2;
end
% Build frequencies array
num_frequencies = floor(abs(rf_frequency/2−
lower_bound_frequencies(end))/frequency_resolution);
                                           % total number of frequencies in waveform
main_frequencies = linspace(rf_frequency/2,rf_frequency/2−
num_frequencies*frequency_resolution+frequency_resolution,num_frequencies);
main_frequencies = fliplr(main_frequencies);
% Add in beat frequencies to encode product ion m/z
for i=1:num_frequencies
  frequencies(2*i−1) = main_frequencies(i);
  frequencies(2*i) = main_frequencies(i) + first_beat_freq_Hz + (i−1)*beat_freq_spacing_Hz;
end
frequencies = fliplr(frequencies);
% Distribute phases so that master waveform has flat amplitude profile
phases = zeros(length(frequencies),1);
for i=1:length(frequencies)
  phases(i) = (frequencies(i)−frequencies(1))^2*scan_time/(2*(frequencies(num_frequencies)−
frequencies(1))*phase_fudge_factor);
end
% Build final waveform point by point, making sure to exclude frequencies
% below the precursor ion frequency
waveform = zeros(num_points,1);
for i=1:num_points
  for n=1:length(frequencies)
    if (frequencies(n) > lower_bound_frequencies(i) +
                                    distance_from_lower_bound)
                              waveform(i) = waveform(i)+sin(2*pi*frequencies(n)*time(i)+phases(n));
    else
      break;
    end
  end
end
```

What is claimed is:

1. A system comprising:

a mass spectrometer comprising an ion trap and one or more detectors; and a central processing unit (CPU), and storage coupled to the CPU for storing instructions that when executed by the CPU cause the system to:

apply one or more scan functions to the ion trap that excite a precursor ion and eject a product ion from the ion trap in a manner that precursor and product ions are correlated without isolation of the precursor ions; and determine a secular frequency of the production or a harmonic thereof by detecting micropackets of the product ion as the micropackets are ejected from the ion trap.

2. The system of claim 1, wherein the one or more scan functions that excite the precursor ion comprise a nonlinear frequency sweep at a constant rf voltage or the one or more scan functions that excite the precursor ion comprise a fixed frequency excitation while the rf amplitude is ramped linearly.

3. The system of claim 2, wherein the one or more scan functions that eject a product ion from the ion trap comprise a broadband waveform.

4. The system of claim 1, wherein a fast Fourier transform of a mass spectral peak recovers the secular frequency of the product ion or a harmonic thereof.

5. The system of claim 1, wherein the system comprises two detectors and a fast Fourier transform of a mass spectral peak recovers twice the secular frequency (and corresponding harmonics) of the product ion.

6. The system of claim 1, wherein a rate of appearance of the micropackets at the one or more detectors corresponds to an excitation frequency of the product ion.

* * * * *